United States Patent
Hay et al.

(10) Patent No.: US 8,609,801 B2
(45) Date of Patent: Dec. 17, 2013

(54) POLYMERS AND COPOLYMERS CONTAINING 2H-BENZIMIDAZOL-2-ONE MOIETIES

(71) Applicant: The Royal Institution for the Advancement of Learning / McGill University, Montreal (CA)

(72) Inventors: Allan S. Hay, Montreal (CA); Aabid Mir, Montreal (CA); Antisar R. Hlil, Pointe-Claire (CA); Sumiko Matsumura, St-Laurent (CA)

(73) Assignee: The Royal Institution for the Advancement of Learning/McGill University, Montreal, Quebec (CA)

( * ) Notice: Subject to any disclaimer, the term of this patent is extended or adjusted under 35 U.S.C. 154(b) by 0 days.

(21) Appl. No.: 13/627,065

(22) Filed: Sep. 26, 2012

(65) Prior Publication Data
US 2013/0085251 A1    Apr. 4, 2013

Related U.S. Application Data

(60) Provisional application No. 61/540,786, filed on Sep. 29, 2011.

(51) Int. Cl.
C08G 8/02 (2006.01)
C08G 8/04 (2006.01)

(52) U.S. Cl.
USPC ............ 528/128; 528/172; 528/226; 528/367

(58) Field of Classification Search
USPC .................................. 528/128, 172, 226, 367
See application file for complete search history.

(56) References Cited

U.S. PATENT DOCUMENTS

| | | | |
|---|---|---|---|
| 3,480,593 A | 11/1969 | George |
| 5,237,062 A | 8/1993 | Hay |
| 6,716,955 B2 | 4/2004 | Burgoyne et al. |
| 7,696,298 B2 | 4/2010 | Hay et al. |

OTHER PUBLICATIONS

Berard, N., Paventi, M., Chan, K.P. and Hay, A.S., Polymers from 4-(4-Hydroxyphenyl)phthalazin-1-one. Makromol. Chem., Macromol. Symp., 1994. 77: p. 379-388.
Yoshida, S. and Hay, A.S., Synthesis of All Aromatic Phthalazinone Containing Polymers by a Novel N-C Coupling Reaction. Macromolecules, 1995. 28: p. 2254-2261.
Wang, S.J., Meng, Y.Z., Hlil, A.R. and Hay, A.S., Synthesis and Characterization of Phthalazinone Containing Poly (arylene ether)s, Poly(arylene thioether)s, and Poly(arylene sulfone)s via a Novel N-C Coupling Reaction. Macromolecules, 2004. 37(1): p. 60-65.
Chang, J.W.W., Xu, X.H. and Chan, P.W.H., Practical copper-catalyzed N-arylation of nitrogen heterocycles with aryl halides under ligand and additive free conditions. Tetrahedron Letters, 2007. 48(2): p. 245-248.
Gao, Y., Hlil, A., Wang, J., Chen, K. and Hay, A.S., Synthesis of Homo- and Copoly(aryl bicarbazole)s via Nucleophilic Substituted Polycondensation Reactions of NH Groups with Activated Dihalides. Macromolecules, 2007. 40(14): p. 4744-4746.
Liu, Y., Qi, Y., Hlil, A.R., Meng, Y. and Hay, A.S., Polycarbazoles via C-N Coupling Reactions of Phthaloyl bis-9H-carbazoles with Activated Difluorides J. Pol. Sci. Chem., 2009. 47: p. 4326-4331.
Hlil, A.R., Matsumura, S. and Hay, A.S., Polymers Containing Di(1H-benzo[d]imidazol-2-yl)arene Moieties: Polymerization via N-C Coupling Reactions. Macromolecules 2008. 41: p. 277-280.
Heyman, D.A., Synthesis of 1,3-Dihydro-2H-Benzimidazol-2-One from 2-Aminobenzamide. J.Hetero. Chem., 1978. 15 (4): p. 573-576.
Vernin, G., Domlog, H., Siv, C., Metzger, J. and Elshafei, A.K., Synthesis of 1-Alkyl and 1,3-Dialkyl-2-Benzimidazolones from 1-Alkenyl-2-Benzimidazolones Using Phase Transfer Catalysis Technique. J.Hetero. Chem., 1981. 18(1): p. 85-89.
Cumper, C.W.N. and Pickerin.Gd, Electric Dipole-Moments of some Imadazolin-2(3)-Ones, and Analogous Thiones. J. Chem. Soc.-Perkin Transactions 2, 1972(14): p. 2045-2048.
Hayward, R.J. and Methcohn, O., N-Bridged Heterocycles.1. Synthesis and Chemistry of N,N'-Polymethylene-Ortho-Phenylene Diamines. J. Chem. Soc.-Perkin Transactions 1, 1975(3): p. 212-219.
Lee, C.C., Wang, P.S., Viswanath, M.B. and Leung, M.K., Synthesis of symmetrical and unsymmetrical N-aryl-substituted cyclic ureas through copper(I) iodide catalyzed Goldberg-Buchwald-Nandakumar C-N coupling reactions. Synthesis-Stuttgart, 2008(9): p. 1359-1366.

*Primary Examiner* — Terressa Boykin
(74) *Attorney, Agent, or Firm* — Norton Rose Fulbright Canada LLP

(57) ABSTRACT

Polymers and copolymers containing 1H-benzo[d]imidazol-2(3H)-one units have been synthesized under conditions generally used for the synthesis of poly(aryl ether)s. 1H-

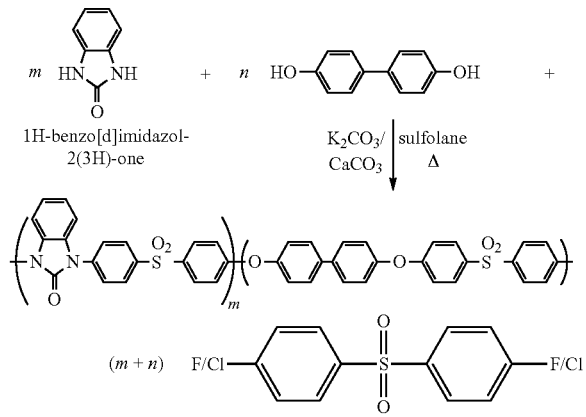

benzo[d]imidazol-2(3H)-one behaves like a biphenol in the polymerization reaction.
The soluble homopolymer has a very high glass transition temperature (348° C.), good thermal stability, and forms flexible transparent films. Because of the low molecular weight (134.14) of the benzoimidazolone monomer in the copolymer formed with 4,4'-biphenol that contains 30 mole % of the benzimidazolone unit, only 8.9 weight % is required to raise the Tg of the poly(arlyl ether)sulfone from 220° C. to 269° C.

16 Claims, 2 Drawing Sheets

POLYMERS AND COPOLYMERS CONTAINING 2H-BENZIMIDAZOL-2-ONE MOIETIES

FIELD OF THE INVENTION

Novel polymers and copolymers containing 1H-benzo[d]imidazol-2(3H)-one units are obtainable from a C—N coupling reaction.

BACKGROUND OF THE INVENTION

We previously found that high molecular weight polymers 1 could be prepared from 4-(4-hydroxyphenyl)phthalazin-1(2H)-one 2 by reaction with activated halides under conditions generally used for the preparation of poly(aryl ether)s [1, 2] (Scheme 1). The C—N coupling reaction was unexpected since the NH group behaves like a phenolic OH group in this reaction. These polymers are excellent high temperature thermoplastics and are currently being commercialized in China.

Scheme 1. Synthesis of Phthalazinone-Containing Polymers

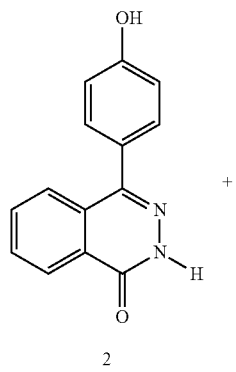

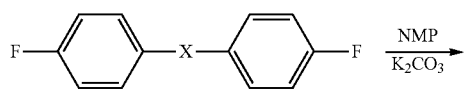

$X = C{=}O, \ SO_2$

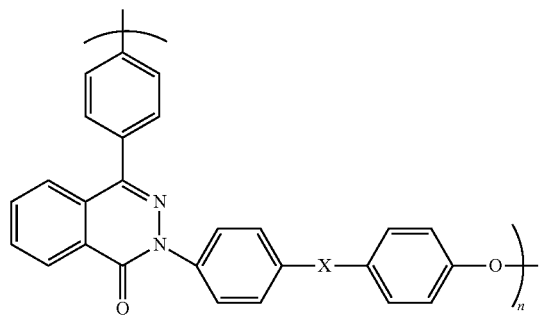

We subsequently prepared bisphthalazinone structures such as 3.[3] The polymers obtained by C—N coupling were very difficult to process, because of insolubility due to crystallinity and very high glass transition temperatures.

This problem was recently alleviated by the synthesis of the more flexible monomers 4 to yield a series of polymers 5.[4]

Scheme 2. Bisphthalazinone-Containing Polymers

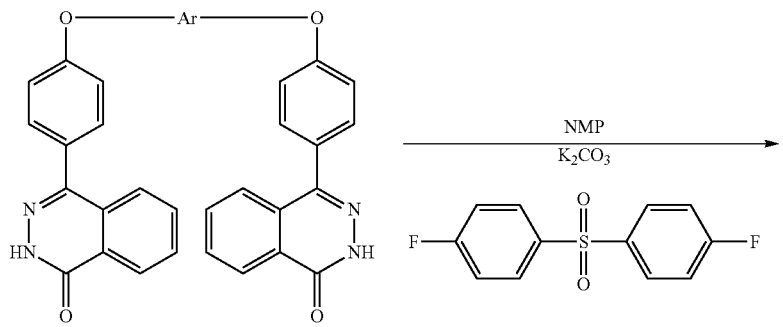

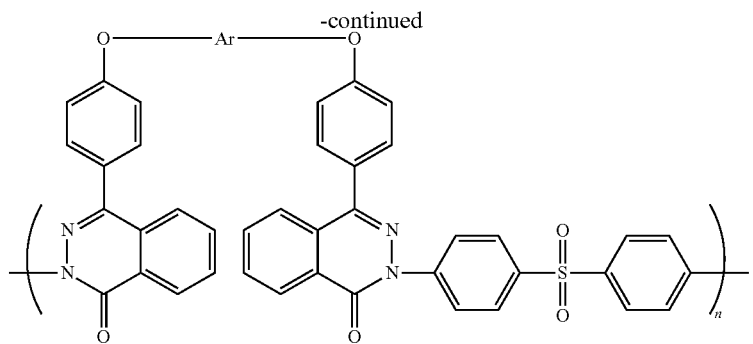

5

A series of polymers have also been synthesized from the closely related pyridazinones.[5] and polyfluorinated phthalazinones.[6]

We have recently found that, at elevated temperatures, biscarbazoles also react with activated halides to give high molecular weight polymers that are thermally stable (Scheme 3). The polymers are highly fluorescent with emission in the blue region of the spectrum.[7] The polymer shown in Scheme 3 is a rigid structure with little flexibility. We have recently reported more flexible biscarbazoles that yield soluble polymers after a C—N coupling polymerization reaction.[8]

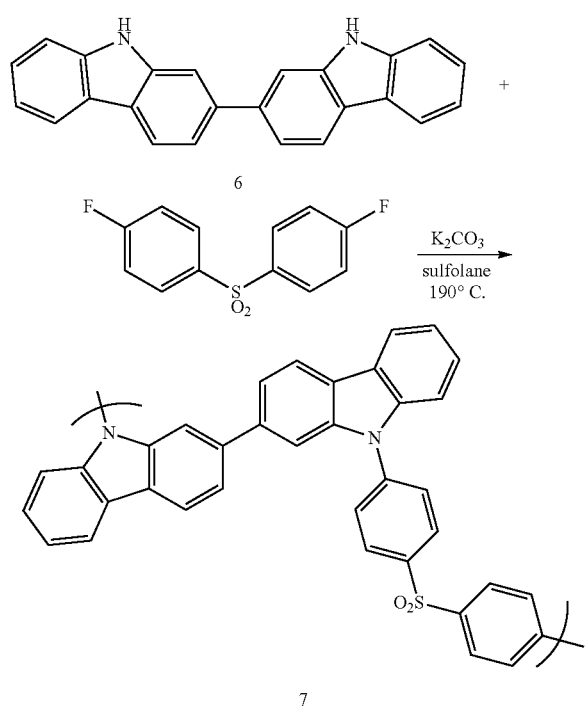

We have also found that the NH group in benzimidazoles will \ undergo a C—N coupling reaction with activated halides, e.g. bis(4-fluorophenyl sulfone).[9, 10] High molecular weight, linear polymers (e.g. 9) were formed from bisbenzimidazoles (e.g. 1,3-bis(1H-benzo[d]imidazol-2-yl)benzene 8 as shown) (Scheme 4).

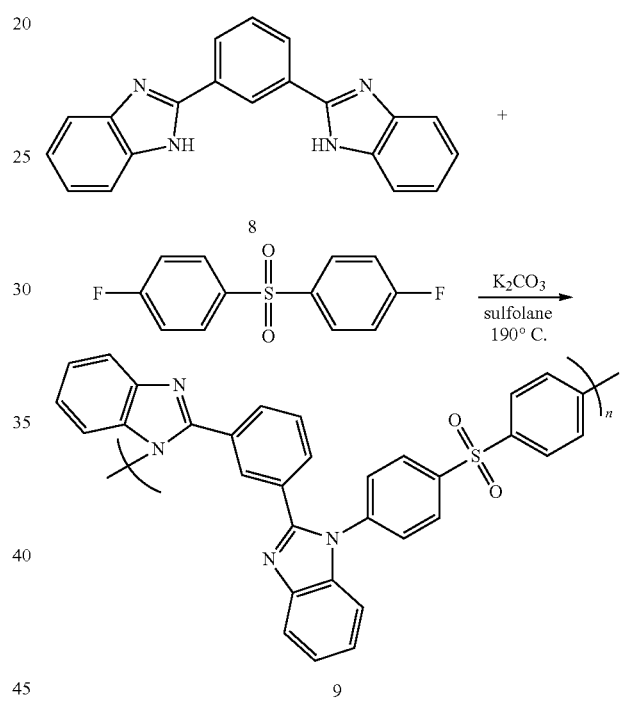

The homopolymers and copolymers have very high Tgs and they are very thermally stable. The Tg of the copolymers ranges between 210° C. (poly(arylene ether) and 296° C. depending on the concentration of the biphenol.

Polybenzimidazolones

The reaction of 1H-benzo[d]imidazol-2(3H)-one 10 with aliphatic chlorides and acyl halides has been described.[11] Benzoimidazolone has been reported to be stable toward acid or base hydrolysis under normal conditions.[12] The reaction with 1,4-bis(chloromethyl)benzene in DMF in the presence of potassium carbonate, for example, is reported to give a polymer with a melt temperature of 213° C. A polymer from 1,5-dichloropentane was also prepared but no properties were given. Reactions with acid chlorides were also carried out. In most cases quite low yields of polymers and no information on molecular weights was provided. The alkylation of benzimidazolone has also been described in a number of other papers.[13-15] The reaction of benzimidazolones with unactivated aromatic halides (e.g. 4-bromoanisole) with a CuI catalyst in toluene at reflux for 24 hours gave an 82% yield of the diaryl-substituted product. Since almost quantitative yields are required in order to synthesize high molecular weight linear polymers, the yields are well short of the yields that would be required to give a high molecular weight polymer using appropriately disubstituted bromo-compounds. [16]

SUMMARY OF THE INVENTION

It is an object of this invention to provide novel polymers, including homopolymers and copolymers, which especially have high Tg and high thermal stability.

It is a further object of this invention to provide cast films, molded products or articles, extruded products or articles and fibers of such novel polymers.

It is a still further object of this invention to provide a process for preparing the novel polymers.

In one aspect of the invention there is provided a polymer or copolymer of the formula 1 formula 1

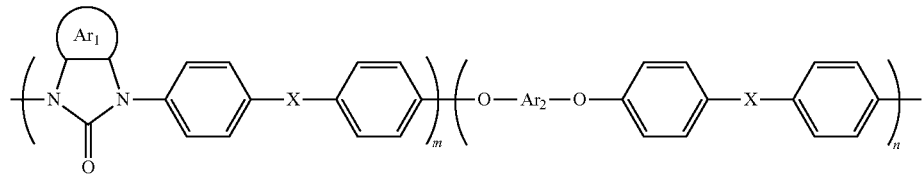

wherein $Ar_1$, $Ar_2$ and X are defined as follows:

$Ar_1$ is defined as a fused ring selected from the group consisting of:

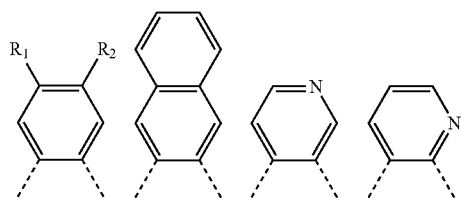

wherein $R_1$ and $R_2$ are radicals independently selected from the group consisting of
H, alkyl, halo, and aryl groups.

$Ar_2$ is a divalent radical selected from the group consisting of:

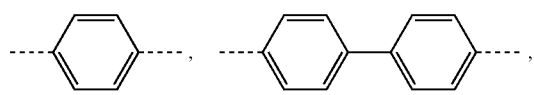

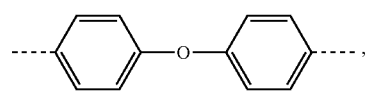

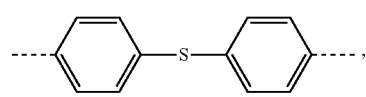

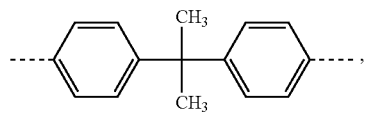

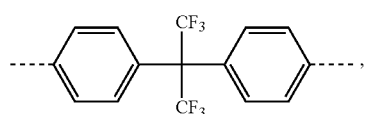

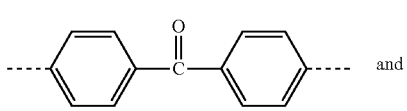

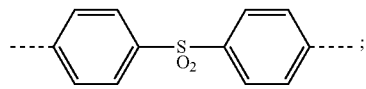

X is a divalent radical selected from the group consisting of:

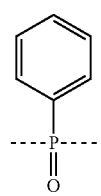

and (m+n) ranges from 1 to 10,000 where m is at least 1 and n is from 0 to 9999.

In another aspect of the invention there is provided a cast film, molded article, extruded article or fiber of the aforementioned polymer.

In still another aspect of the invention there is provided a process for the preparation of a polymer of formula 1

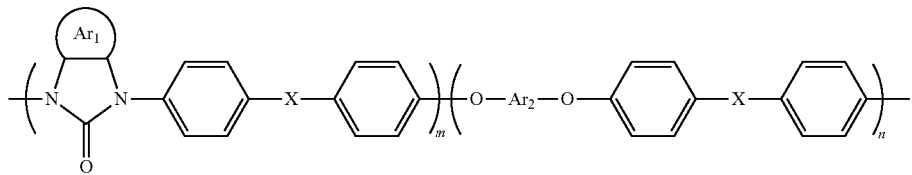
as defined above, where n=0, comprising the reaction step:
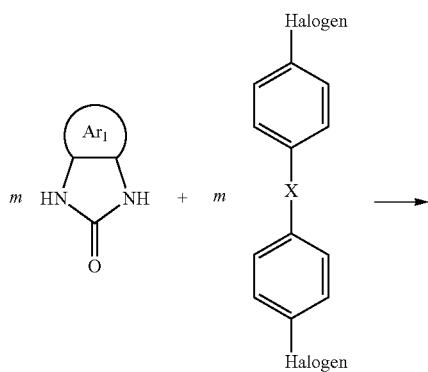
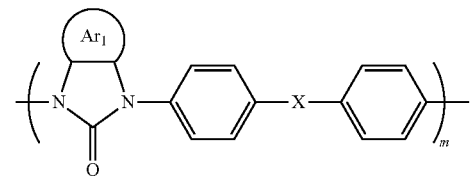
at a temperature of at least 160° C. wherein $Ar_1$, $Ar_2$, and m are as defined above, n is 0, and Halogen is F or Cl.
In still another aspect of the invention there is provided a process for the preparation of a copolymer of formula 1
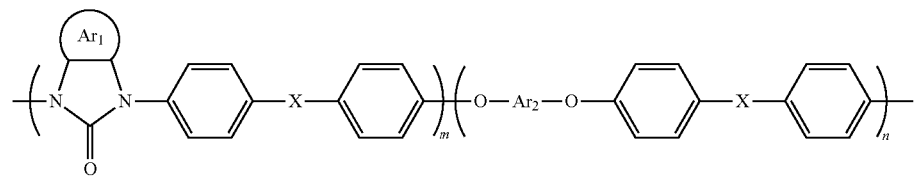
as defined above, wherein n is at least 1, comprising the reaction step
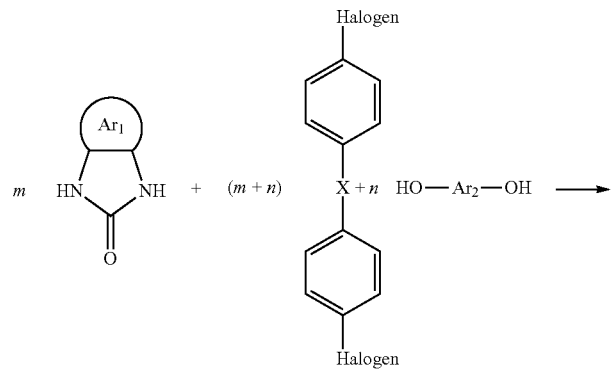
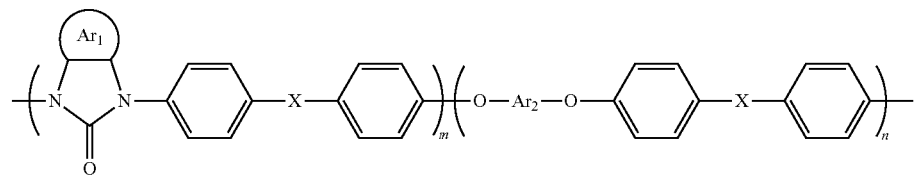

at a temperature of at least 160° wherein $Ar_1$, $Ar_2$, m and n are as defined above, and Halogen is F or Cl.

In the case of $R_1$ and $R_2$, where these are selected from alkyl they may, by way of example have 1 to 6 carbon atoms, especially methyl or ethyl, where they are selected from aryl they may, by way of example have 6 to 11 ring carbon atoms; and where they are selected from halo they may be, by way of example, fluoro or chloro.

Within the above range m might be for example 30 to 500, n might be for example 0 to 500, in a typical polymer; in a typical copolymer m might be for example 30 to 500 and n might be, for example, 30 to 500.

DESCRIPTION OF THE INVENTION

We have now found that benzimidazolone also behaves like a bisphenol and gives high yields of linear, high molecular weight polymers 11 under conditions similar to those used to synthesize poly(aryl ether)s and polybenzimidazoles by a nucleophilic condensation reaction with activated aromatic dihalides.[10] These polymers can be cast into tough, flexible, and transparent films. They can also be readily molded or extruded into various shapes or melt spun into fibers. The synthesis of the polymeric sulfones 11 and ketones 12 is illustrated below (Scheme 5).

Sheme 5. Synthesis of Polybenzimidazolone Sulfones and Ketones

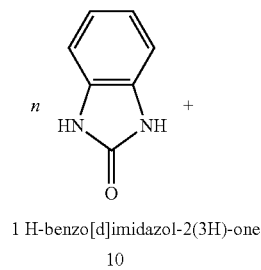

1 H-benzo[d]imidazol-2(3H)-one
10

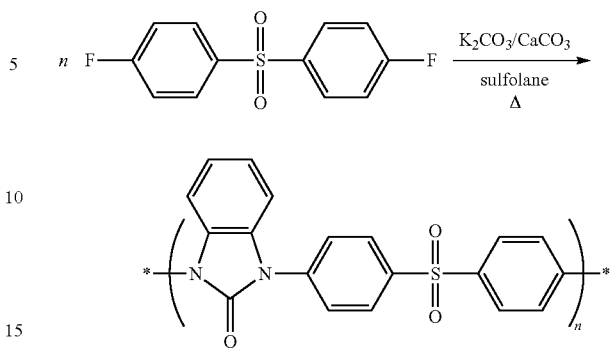

11

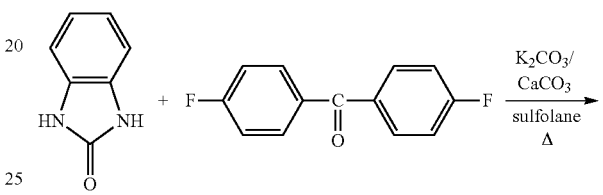

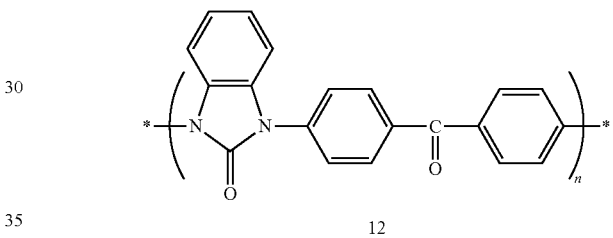

12

We have also synthesized high molecular weight copolymers 13 by copolymerizing the benzimidazol-2-one with bisphenols, e.g. 4,4'-biphenol. (Scheme 6).

Scheme 6. Polybenzimidazolone Copolymers from 4, 4'-Biphenol

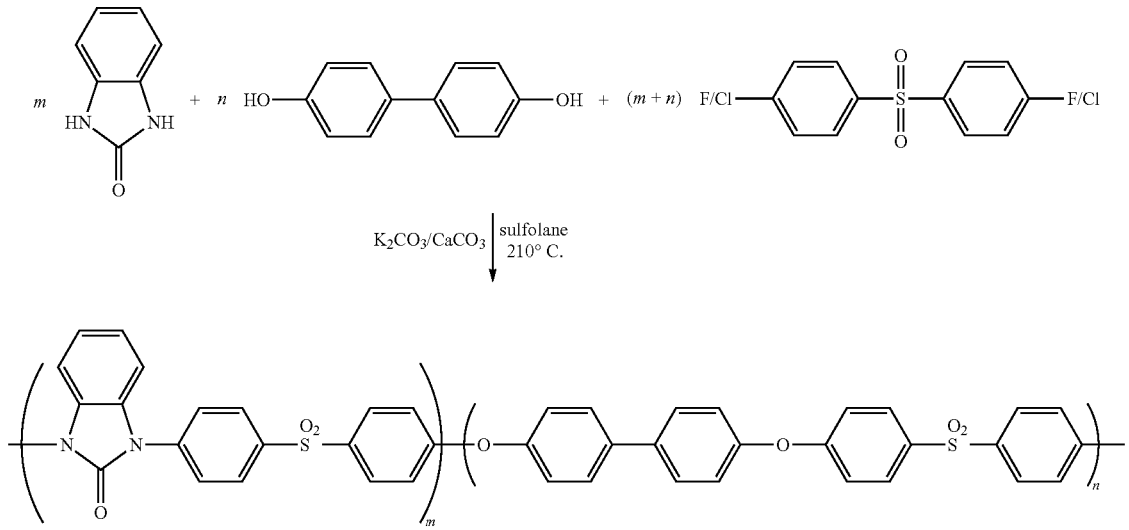

These polymers have very high Tgs and they are very thermally stable. The $T_{d-5}\%$ (5% weight loss in $N_2$) for copolymers was around 520° C. Because of the very high Tg of the homopolymer (348° C.), only small amounts of the 2H-benzimidazol-2-one needs to be added to raise the Tg of the resulting copolymer to much higher temperatures to open up new potential applications because of the higher use temperatures possible. Only 30 mole % of the benzimidazolone unit is required to raise the Tg from 220° C. to 269° C. for the commercially available polymer Radel 5000 (Tg 220° C.), as shown in the Table below as prepared from 4,4'-biphenol and bis(4-chlorophenyl)sulfone.

TABLE 1

Polybenzimidazolone Copolymers from 4,4'-Biphenol

| Example | (benzimidazolone) | (biphenol) | Tg (° C.) | TGA-5% (° C.) | $\eta_{inh}$ (dL/g) |
|---|---|---|---|---|---|
| 2 | 70% | 30% | 316 | 465 | 1.31 |
| 3 | 50% | 50% | 290 | 506 | 1.14 |
| 4 | 30% | 70% | 269 | 514 | 1.31 |

The molecular weight of the benzimidazolone monomer (HAH) is only 134.14, much lower than the molecular weights of other —NH monomers we have previously reported, as shown in Table 2. A polysulfone containing 50 mole % benzimidazolone, that has a Tg of 290° C., therefore requires only 17.9 weight % of the monomer, approximately ½ the amount by weight of the heterocyclic monomer needed in previous systems. The polymer containing 50 mole % benzimidazolone requires only 17.9 weight % of the benzimidazolone monomer to give a Tg of 290° C. in the copolymer (Table 2) and 8.9 weight % of the benzimidazolone monomer to give a Tg of 269° C. in the copolymer.

TABLE 2

A comparison of Tgs of Copolymers Containing 50 Weight % of Various N-containing monomers

| X | N-monomer | Tg | weight % N-monomer |
|---|---|---|---|
| H-A-H | 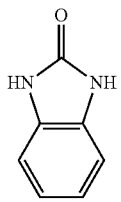 Molecular Weight: 134.14 | 290° C. | 17.9 |

TABLE 2-continued

A comparison of Tgs of Copolymers Containing 50 Weight % of Various N-containing monomers

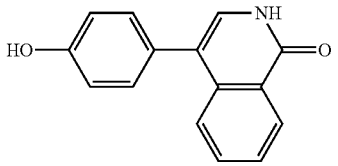

| X | N-monomer | Tg | weight % N-monomer |
|---|---|---|---|
| H-B-H | 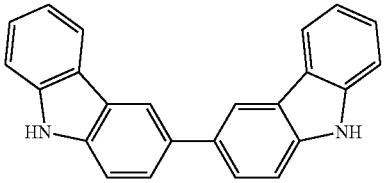  Molecular Weight: 237.25 | 269° C. | 27.8 |
| H-C-H | Molecular Weight: 332.40 | 295° C. | 35.1 |
| H-D-H | Molecular Weight: 310.35 | 260° C. | 33.5 |

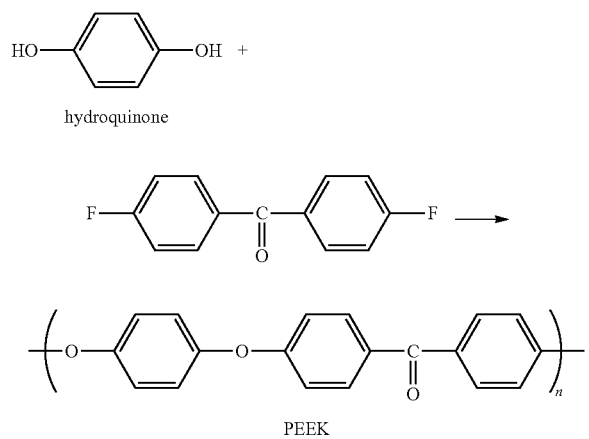

Scheme 7. Synthesis of PEEK

PEEK has a Tm of 143° C. We have found that the replacement of some of the hydroquinone with the benzimidazolone monomer also significantly increases the Tg as shown in Table 3.

| mole % 1H-benzo[d]imidazol-2(3H)-one | Tg ° C. |
|---|---|
| 12.5% | 163 |
| 20% | 180 |
| 30% | 186 |

Examination of molecular models of the intermediate obtained by reaction of benzimidazolone provides an explanation. The barrier to rotation of the very flexible C—O—C bond in the polysulfone is only 2.17 Kcal/mol, whereas the barrier to rotation of the C—N—C bond is calculated to be 41.79 Kcal/mol and therefore produces a rigid segment in the polymer chain.

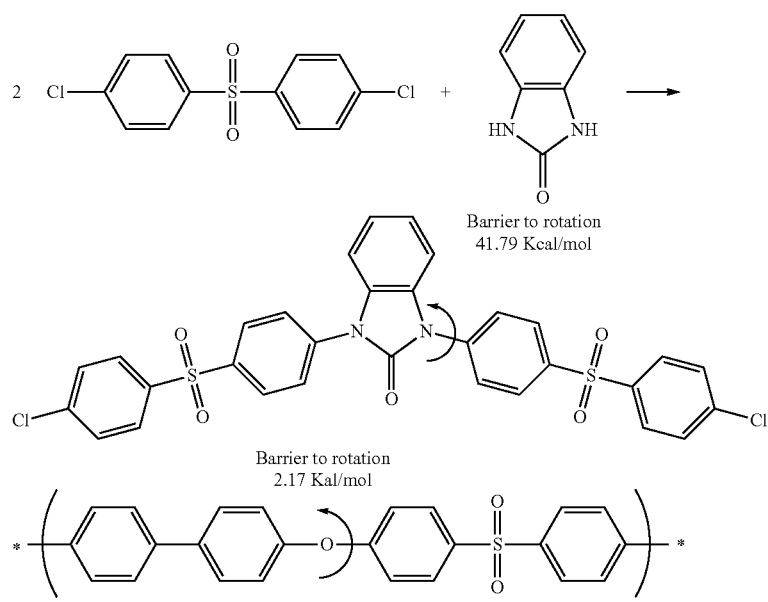

The reaction of 2H-benzimidazol-2-one with an equivalent amount of bis(4-fluorophenyl)sulfone yields a high molecular weight linear polymer, however, the same reaction with bis(4-chlorophenyl)sulfone is much slower and requires long times at elevated temperatures, and yields a dark-colored low molecular weight product. Similarly, copolymers with bisphenols also require long reaction times and yield dark-colored products. The reaction with bisphenols is much faster than the reaction with the NH groups in benzimidazolone so that the end groups during the polymerization reaction are predominantly unreacted —NH groups, thus requiring higher temperatures and longer times to drive the reaction to completion. During this period degradation reactions involving the —NH moieties probably occurs. To overcome this, we have first reacted the benzimidazolone monomer with the total amount of bis(4-chlorophenyl)sulfone required for copolymer formation to prepare low molecular weight products with, exclusively, chloro-end groups. At the end of the first stage reaction the bisphenol was then added and high molecular weight polymer was formed at the low temperatures now required for this reaction of the chloro-oligomers with the OH groups to yield colorless products.

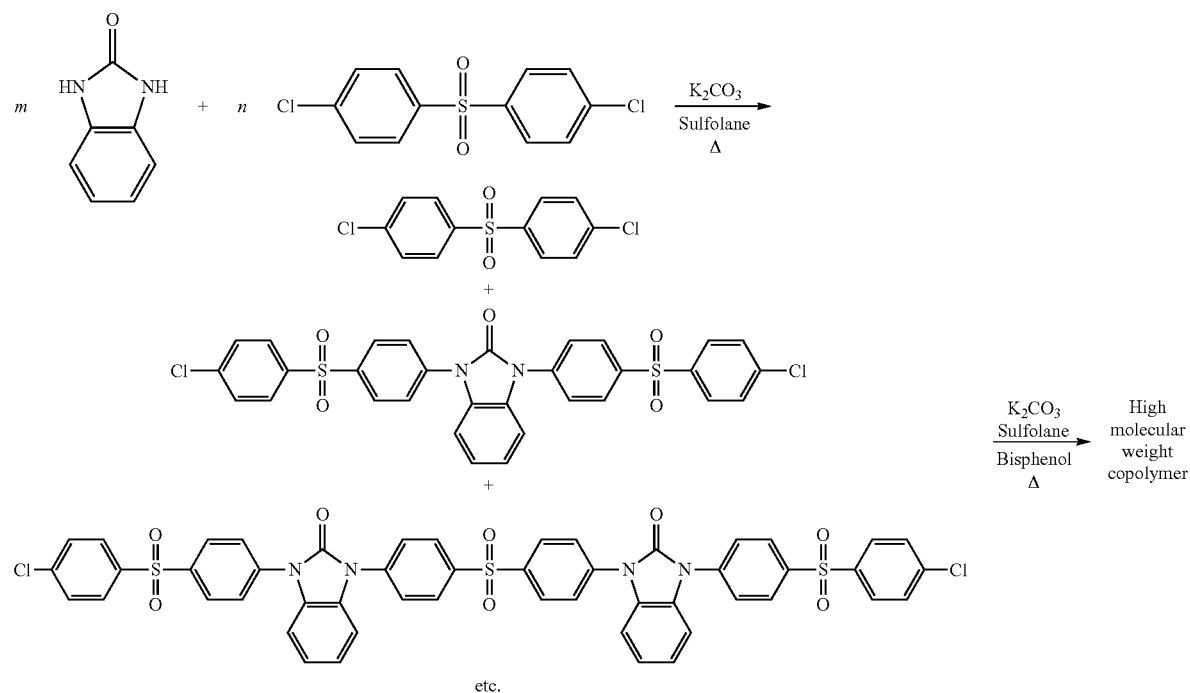

Scheme 8. Synthesis of high molecular weight copolymers from bis(4-chlorophenyl)sulfone via a 2-step process Our work has now demonstrated that the synthesis of these high molecular weight polymers via C—N coupling reactions is a general reaction. A new family of engineering thermoplastics with a range of higher use temperatures is, therefore, now possible where the Tg of the copolymers can be tailored to the needs of the potential application. Other copolymers have also been prepared as illustrated.

EXAMPLES

Characterization

Matrix assisted laser desorption ionization time-of-flight (MALDI-TOF) mass spectra were recorded on a BRUKER Autoflex III Smartbeam (trademark) MALDI-TOF mass spectrometer with the instrument set in positive reflection mode to get higher resolution. Atmospheric pressure chemical ionization mass spectrometry (APCI-MS) was performed in positive ion mode on a Finnigan LCQDUO (trademark) mass spectrometer. Ultraviolet-visible (UV-vis) absorption spectra were recorded on a CARY 5000 UV-Vis-NIR spectrophotometer. Fluorescent spectra were recorded on a FluoroMax-2 (trademark) spectrofluorometer. The progress of reaction for monomer synthesis and the purity of monomer were analyzed by high performance liquid chromatography (HPLC, Hewlett Packard Agilent 1100 HPLC-trademark) with methanol as an eluent and a UV detector at 254 nm. Differential scanning calorimetry (DSC) was performed on a TA instruments DSC Q2000 (trademark) at a heating rate of 20° C./min under $N_2$ atmosphere (flow rate of 50 mL/min). Tg was reported as the temperature at the middle of the thermal transition from the second heating scan, Tm was reported as the temperature at the minimum endothermic peak from the second heating scan, and Tc was reported as the temperature at the maximum exothermic peak from the second heating scan. Thermogravimetry (TGA) was performed on a Seiko 220 (trademark) TGA/DTA instrument at a heating rate of 20° C./min under $N_2$ atmosphere (flow rate of 200 mL/min), and TGA −5% was reported as temperature at which 5% weight loss was observed. Inherent viscosity was measured with an Ostwald viscometer at 30° C. in NMP at a concentration of 0.5 g/dL. A water bath with a Julabo (trademark) (Model type PC) heater was employed to control the temperature. Molecular weight and MW distribution of copolymers were measured by gel permeation chromatography (GPC) on a Waters 510 system equipped with three consecutive polystyrene gel columns (Phenomenex Phenogel (trademark) 5 μm 500 Å, 5 μm $10^4$ Å, and 5 μm Linear/Mixed), eluted with chloroform at a flow rate of 1.0 mL/min, and calibrated with polystyrene standards. Molecular weight and MW distribution of homopolymers were measured by GPC equipped with Viscogel G-MBLMW-3078 (trademark) column and a Water 410 (trademark) refractive index detector, eluted with DMF at a flow rate of 1.0 mL/min at 30° C., and calibrated with polyethylene glycol standards. Molecular modeling was carried out using the program Fujitsu Cache 4.5 for Macintosh.

Homopolymers

Polymers containing 2H-benzimidazol-2-one moieties. Polymerization via a C—N coupling reaction.

Example 1

Polymerization of 2H-benzimidazol-2-one with bis(4-fluorophenyl)sulfone

Alternate names
1,3-dihydro-2H-benzimidazol-2-one
2(1H)-Benzimidazol-2-one
1H-benzo[d]imidazol-2(3H)-one

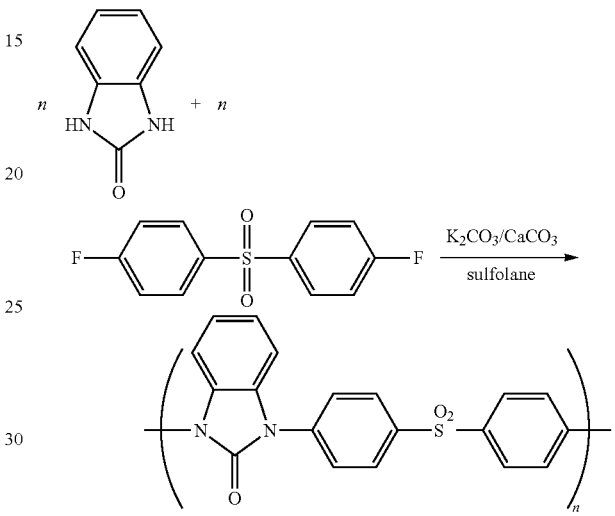

The following procedure is typical for the preparation of homopolymer.

To a 25 mL three-necked round-bottom flask equipped with a Dean-Stark trap, a condenser, a magnetic stirrer, and an argon inlet were added 1H-benzo[d]imidazol-2(3H)-one (0.27 g, 2.0 mmol), bis(4-fluorophenyl)sulfone (0.51 g, 2.0 mmol), $CaCO_3$ (0.20 g, 2.0 mmol), anhydrous $K_2CO_3$ (0.28 g, 2.0 mmol), sulfolane (1.4 g), and chlorobenzene (3 mL). The mixture was heated to azeotrope off the resulting water with chlorobenzene. The chlorobenzene was then removed, and the mixture was heated at 180-200° C. for 1-2 h. When the reaction system became too viscous to be stirred, an additional 2 g of sulfolane was added to dilute the solution, and it was kept at 200° C. for an additional 30 min until the viscosity significantly increased. The reaction mixture was cooled down, and diluted with dichloromethane. The solution was poured into 100 mL of methanol containing 1 mL of acetic acid to precipitate out the resulting polymer. The precipitated polymer was collected by filtration, and redissolved in dichloromethane. The dichloromethane solution was filtered through a thin layer of Celite (trademark) to remove inorganic materials. The polymer was further purified by reprecipitation from dichloromethane solution into methanol. The polymer collected by filtration was dried in vacuo at 80° C. for 24 h (yield 93%). Flexible, and creaseable films were cast from its dichloromethane-solution containing a few drops of 1,1,2,2-tetrachloroethane. The homopolymer was soluble in various dipolar aprotic solvents such as N,N-dimethylformamide (DMF), 1-methyl-2-pyrrolidinone (NMP), and N,N-dimethylacetamide (DMAc). Tg 348° C., TGA −5% weight loss 487° C. Mn 16 000, Mw 35 000, PD 2.2.

Copolymerization Reactions with Biphenols.

Examples 2-4

Copolymerization of 2H-benzimidazol-2-one with 4,4'-biphenol and bis(4-fluorophenyl)sulfone

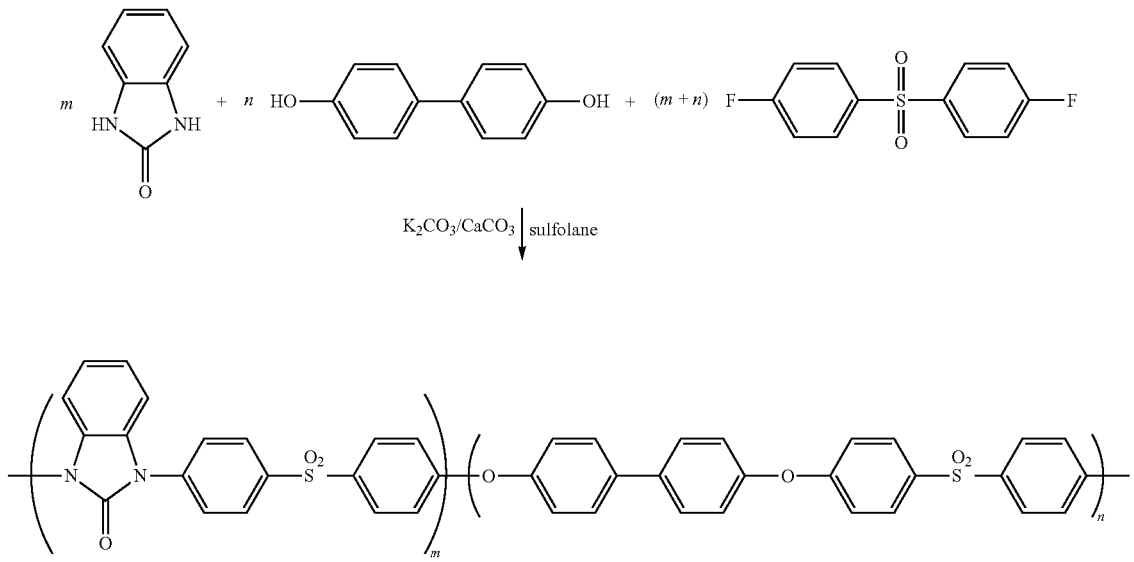

Example 4 is a typical procedure used for the copolymerization reactions.

To a 25 mL three-necked round-bottom flask equipped with a Dean-Stark trap, a condenser, a magnetic stirrer, and an argon inlet were added 4,4'-biphenol (0.26 g, 1.4 mmol), benzimidazol-2-one (0.080 g, 0.60 mmol), bis(4-fluorophenyl)sulfone (0.51 g, 2.0 mmol), CaCO$_3$ (0.20 g, 2.0 mmol), anhydrous K$_2$CO$_3$ (0.28 g, 2.0 mmol), sulfolane (1.6 g), and chlorobenzene (3 mL). The mixture was heated to azeotrope off the resulting water with chlorobenzene. The chlorobenzene was then removed, and the mixture was heated at 180-200° C. for 1-2 h. When the reaction system became too viscous to be stirred, an additional 2 g of sulfolane was added to dilute the solution, and the mixture was kept at 200° C. for an additional 30 min until the viscosity significantly increased. The reaction mixture was cooled down, and diluted with dichloromethane. The solution was poured into 100 mL of methanol containing 1 mL of acetic acid to precipitate out the resulting polymer. The precipitated polymer was collected by filtration, and redissolved in dichloromethane. The dichloromethane solution was filtered through a thin layer of Celite to remove inorganic materials. The polymer was further purified by reprecipitation from dichloromethane solution into methanol. The polymer collected by filtration was dried in vacuo at 80° C. for 24 h (yield 91%). Flexible, creaseable, and transparent films were cast from its dichloromethane solution. The copolymers were soluble in various organic solvents such as chloroform and dichloromethane.

The property data for the copolymers are shown below:

| Example | benzimidazol-2-one | bis(4-fluorophenyl)sulfone | 4,4'-biphenol | Tg (° C.) | TGA-5% (° C.) | $\eta_{inh}$ (dL/g) | Mn | Mw | PD |
|---|---|---|---|---|---|---|---|---|---|
| 2 | 70% | 100% | 30% | 315 | 465 | 1.31 | 68000 | 130000 | 1.9 |
| 3 | 50% | 100% | 50% | 290 | 506 | 1.14 | 60000 | 120000 | 2.0 |
| 4 | 30% | 100% | 70% | 269 | 514 | 1.31 | 32000 | 54000 | 1.7 |

Examples 5-7

Copolymerization of benzimidazol-2-one with bisphenol A (BPA) and bis(4-fluorophenyl)sulfone

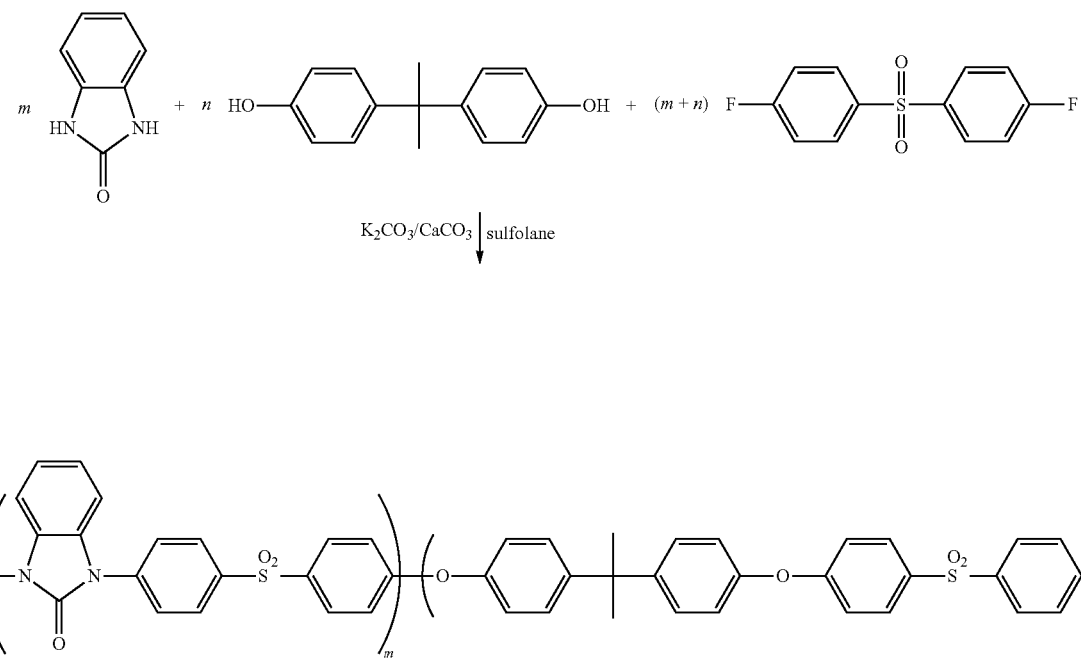

Example 5 is a typical procedure used for the copolymerization reactions.

To a 25 mL three-necked round-bottom flask equipped with a Dean-Stark trap, a condenser, a magnetic stirrer, and an argon inlet were added BPA (0.14 g, 0.60 mmol), benzimidazol-2-one (0.19 g, 1.4 mmol), bis(4-fluorophenyl)sulfone (0.51 g, 2.0 mmol), $CaCO_3$ (0.20 g, 2.0 mmol), anhydrous $K_2CO_3$ (0.28 g, 2.0 mmol), sulfolane (1.6 g), and chlorobenzene (3 mL). The reaction mixture was heated to azeotrope off the resulting water with chlorobenzene. The chlorobenzene was then removed, and the resulting mixture was heated at 180-200° C. for 1-2 h. When the reaction system became too viscous to be stirred, an additional 2 g of sulfolane was added to dilute the solution, and the mixture was kept at 200° C. for an additional 30 min until the viscosity significantly increased. The reaction mixture was cooled down and diluted with dichloromethane. The solution was poured into 100 mL of methanol containing 1 mL of acetic acid to precipitate out the resulting polymer. The precipitated polymer was collected by filtration, and redissolved in dichloromethane. The dichloromethane solution was filtered through a thin layer of Celite to remove inorganic materials. The polymer was further purified by reprecipitation from dichloromethane solution into methanol. The polymer collected by filtration was dried in vacuo at 80° C. for 24 h (yield 92%). Flexible, and creaseable films were cast from its dichloromethane solution.

| Examples | benzimidazol-2-one | bis(4-fluorophenyl)sulfone | BPA | Tg (° C.) | TGA-5% (° C.) | $\eta_{inh}$ (dL/g) | Mn | Mw | PD |
|---|---|---|---|---|---|---|---|---|---|
| 5 | 70% | 100% | 30% | 283 | 462 | 0.65 | 17000 | 40000 | 2.3 |
| 6 | 50% | 100% | 50% | 245 | 471 | 0.60 | 15000 | 36000 | 2.5 |
| 7 | 30% | 100% | 70% | 225 | 480 | 0.58 | 17000 | 33000 | 2.0 |

Example 8

Copolymerization of benzimidazol-2-one with 4,4'-(perfluoropropane-2,2-diyl)diphenol and bis(4-fluorophenyl)sulfone

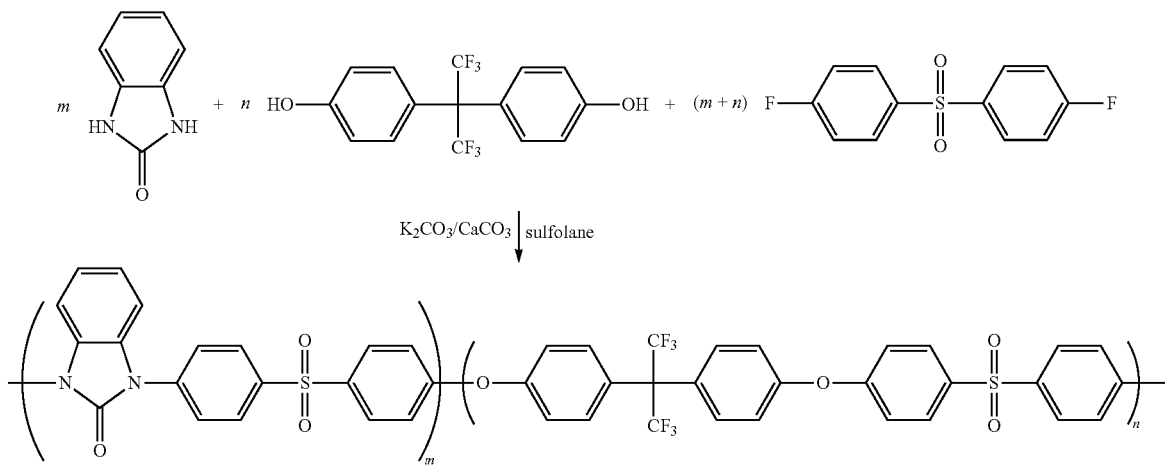

To a 25 mL three necked round-bottom flask equipped with a Dean-Stark trap, a condenser, a magnetic stirrer, and an argon inlet were added 4,4'-(perfluoropropane-2,2-diyl) diphenol (0.34 g, 1.0 mmol), benzimidazol-2-one (0.13 g, 1.0 mmol), bis(4-fluorophenyl)sulfone (0.51 g, 2.0 mmol), $CaCO_3$ (0.20 g, 2.0 mmol), anhydrous $K_2CO_3$ (0.28 g, 2.0 mmol), sulfolane (1.8 g), and chlorobenzene (3 mL). The mixture was heated to azeotrope off the resulting water with chlorobenzene. The chlorobenzene was then removed, and the resulting mixture was heated at 180-190° C. for 1-2 h. When the reaction system became too viscous to be stirred, an additional 2 g of sulfolane was added to dilute the solution. The mixture was kept at 190° C. for an additional 30 min until the viscosity significantly increased. The reaction mixture was cooled down, and diluted with dichloromethane. The solution was poured into 100 mL of methanol containing 1 mL of acetic acid to precipitate out the resulting polymer. The precipitated polymer was collected by filtration, and redissolved in dichloromethane. The dichloromethane solution was filtered through a thin layer of Celite to remove inorganic materials. The polymer was further purified by reprecipitation from dichloromethane solution into methanol. The polymer collected by filtration was dried in vacuo at 80° C. for 24 h (yield 99%). Creaseble films were cast from its dichloromethane-solution. Tg 254° C., TGA −5% weight loss 509° C.

Examples 9-10

Copolymerization of benzimidazol-2-ones with 4,4'-biphenol and bis(4-chlorophenyl)sulfone. One-step reaction

Example 9

1H-benzo[d]imidazol-2(3H)-one (0.080 g, 0.60 mmol), 4,4'-biphenol (0.26 g, 1.4 mmol), $Cs_2CO_3$ (0.13 g, 0.40 mmol), powdered KOH (0.20 g, 3.6 mmol), sulfolane (1.2 g), and chlorobenzene (3 mL) were charged into a 25 mL three-necked round-bottom flask equipped with a magnetic stirrer, an argon inlet, and a Dean-Stark trap with a condenser under argon atmosphere. The mixture was heated and stirred at 175° C. for 1 h to azeotrope off water. After the removal of chlorobenzene, the reaction mixture was cooled. To the cooled reaction mixture was added bis(4-chlorophenyl)sulfone (0.58 g, 2.0 mmol). The mixture was heated and stirred at 195° C. for 13 h with the frequent addition of another 1 g of sulfolane, each time the reaction system became too viscous to be stirred. The resulting mixture was cooled, quenched by addition of acetic acid, and then poured into methanol. The precipitated polymer was collected by filtration and washed with boiling methanol. The crude polymer was redissolved in chloroform, and the chloroform solution was filtered through a thin layer of Celite to remove inorganic materials. The polymer was further purified by reprecipitation from chloroform solution into methanol. The polymer collected by filtration was washed thoroughly with boiling methanol, and dried in vacuo at 55° C. overnight to afford 30% copolymer in 96% yield (0.74 g) as a white fiber. The resulting polymer was soluble in various organic solvents such as chloroform. Flexible, creaseable, transparent, and light yellow films were obtained from its chloroform-solution.

Example 10

The copolymers were prepared in the same manner as Example 9, except that KOH (2.0 mmol) and $Cs_2CO_3$ (1.2 mmol) were used. The polymerization reaction was completed by heating at 190° C. for 51 h. The resulting polymer was soluble in various dipolar aprotic solvents such as DMF. Flexible, creaseable, transparent, and very light brown films were obtained from a DMAc solution of the polymer.

| Example | benzimidazol-2-one | bis(4-chlorophenyl)sulfone | 4,4'-biphenol | Tg (°C.) | TGA-5% (°C.) | $\eta_{inh}$ (dL/g) |
|---|---|---|---|---|---|---|
| 9 | 30% | 100% | 70% | 263 | 505 | 0.67 |
| 10 | 40% | 100% | 60% | 265 | 497 | 0.59 |

Examples 11-12

Copolymerization of benzimidazol-2-one with 4,4'-biphenol and bis(4-chlorophenyl)sulfone. Reaction carried out in two steps

Example 11

K$_2$CO$_3$ (325 mesh) was dried at 300° C. in an oven overnight. 1H-benzo[d]imidazol-2(3H)-one (0.16 g, 1.2 mmol), bis(4-chlorophenyl)sulfone (1.2 g, 4.0 mmol), K$_2$CO$_3$ (325 mesh, 0.20 g, 1.4 mmol), sulfolane (1.2 g), and chlorobenzene (3 mL) were charged into a 25 mL three-necked round-bottom flask equipped with a magnetic stirrer, an Ar inlet, and a Dean-Stark trap with a condenser under Ar atmosphere. The mixture was heated, and stirred at 225-235° C. for 1.3 h. The water thus formed and chlorobenzene was removed. After confirming by APCI-MS that all the NH groups in the benzimidazolidin-2-one moieties had reacted, to the cooled reaction mixture were added 4,4'-biphenol (0.52 g, 2.8 mmol), K$_2$CO$_3$ (325 mesh, 0.46 g, 3.4 mmol), and chlorobenzene (3 mL). The mixture was heated and stirred at 215-220° C. for 1.5 h, with the addition of another 3 g of sulfolane during this reaction period. The resulting mixture was cooled, quenched by addition of acetic acid, and then poured into methanol. The precipitated polymer was collected by filtration and washed with boiling methanol. The crude polymer was redissolved in chloroform. The chloroform solution was filtered through a thin layer of Celite to remove inorganic materials and the polymer was further purified by reprecipitation from chloroform solution into methanol. The polymer collected by filtration was washed thoroughly with boiling methanol, and dried in vacuo at 55° C. overnight to afford 30 mole % copolymer in 98% yield (1.5 g) as a white fiber. The resulting polymer was soluble in various organic solvents such as dichloromethane. Flexible, creaseable, transparent, and pale yellow films were obtained from its dichloromethane-solution.

Example 12

The copolymer was prepared in the same manner as Example 11, except that in the first-step reaction of NH groups in the benzimidazolidin-2-one moieties with activated aromatic chloride groups was prolonged to 2 h at 225-235° C. The resulting polymer was soluble in various organic solvents such as DMAc. Flexible, creaseable, transparent, and pale yellow films were cast from a dichloromethane solution containing a few drops of 1,1,2,2-tetrachloroethane.

The property data for the copolymers are shown below:

| Examples | benzimidazol-2-one | bis(4-chlorophenyl)sulfone | 4,4'-biphenol | Tg (°C.) | TGA-5% (°C.) | $\eta_{inh}$ (dL/g) |
|---|---|---|---|---|---|---|
| 11 | 30% | 100% | 70% | 244 | 535 | 0.35 |
| 12 | 40% | 100% | 60% | 265 | 501 | 0.61 |

Examples 13-14

Copolymerization of benzimidazol-2-one with 4,4'-biphenol and bis(4-chlorophenyl)sulfone. Reaction carried out in one-step using anhydrous sodium carbonate and a catalytic amount of potassium carbonate.

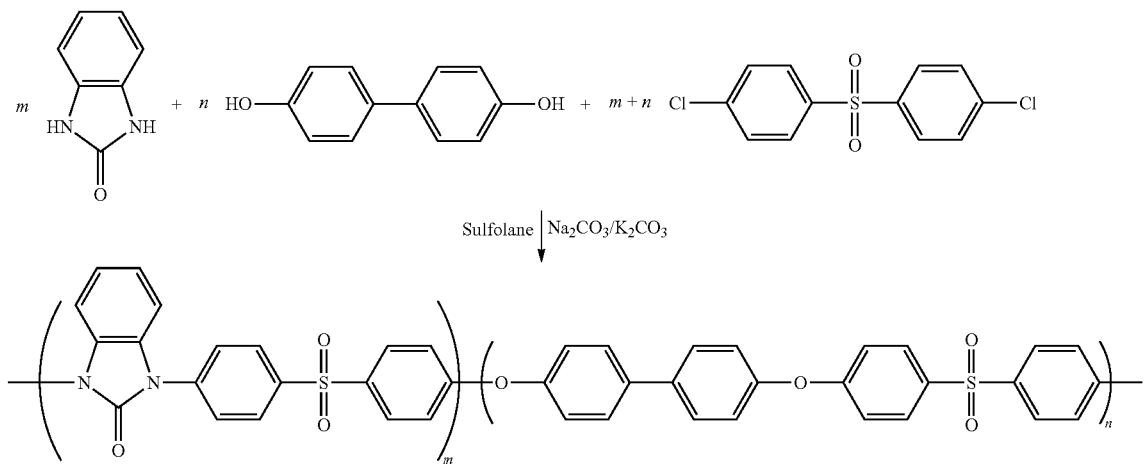

Example 13

This Example is a Typical Procedure Used for the Copolymerization Reaction

Na$_2$CO$_3$ and K$_2$CO$_3$ (325 mesh) were dried at 300° C. in an oven overnight. 1H-benzo[d]imidazol-2(3H)-one (0.08 g, 0.60 mmol), bis(4-chlorophenyl)sulfone (0.57 g, 2.0 mmol) and 4,4'-biphenol (0.26 g, 1.40 mmole) were charged into a 3-necked flask equipped with a stirrer, a nitrogen inlet and a water condenser. The mixture was heated in sulfolane with stirring to 180° C. to form a nearly colorless solution and, while maintaining a nitrogen blanket, anhydrous sodium carbonate (0.21 g, 2.0 mmole) and anhydrous potassium carbonate (0.0069 g, 0.05 mmole) were added to the reaction mixture. The temperature was raised to 200° C. and maintained at this temperature for 2 hrs. The temperature was then raised to 230-240° C. and maintained for 1 hr, and finally raised to 280° C. and maintained for 2 hr until the reaction mixture became too viscous to stir. The resulting polymer was diluted in NMP, filtered through thin layer of Celite, the crude polymer precipitated in 200 mL of methanol containing 2 mL of acetic acid and the precipitated polymer was collected by filtration and washed with boiling methanol. The polymer was redissolved in dichloromethane and the dichloromethane solution was filtered through a thin layer of Celite to remove inorganic materials. The polymer collected by filtration was washed thoroughly with boiling methanol and finally with water, and dried in vacuo at 80° C. overnight to afford in, 94% yield, a white fiber. The resulting polymer was soluble in various organic solvents such as dichloromethane. Flexible, creaseable and transparent films were obtained from its dichloromethane solution.

The property data for the copolymers are shown below:

| Example | benzimidazol-2-one | bis(4-chlorophenyl)sulfone | 4,4'-biphenol | Tg (° C.) | TGA-5% (° C.) | $\eta_{inh}$ (dL/g) |
|---|---|---|---|---|---|---|
| 13 | 30% | 100% | 70% | 240 | 516 | 0.43 |
| 14 | 40% | 100% | 60% | 260 | 514 | 0.89 |

Example 15

Copolymerization of benzimidazol-2-one with 4,4'-thiodibenzenethiol and bis(4-fluorophenyl)sulfone

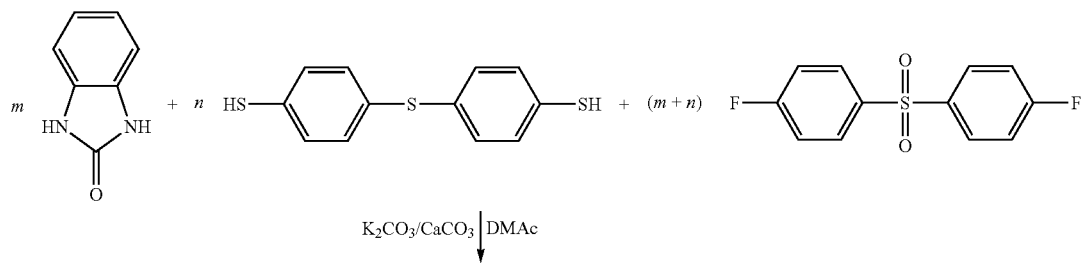

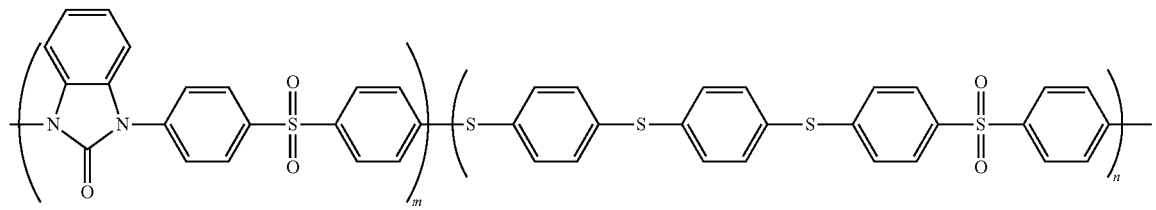

To a 25 mL three necked round-bottom flask equipped with a Dean-Stark trap, a condenser, a magnetic stirrer, and an argon inlet were added 4,4'-thiodibenzenethiol (0.25 g, 1.0 mmol), benzimidazol-2-one (0.13 g, 1.0 mmol), bis(4-fluorophenyl)sulfone (0.51 g, 2.0 mmol), $CaCO_3$ (0.20 g, 2.0 mmol), anhydrous $K_2CO_3$ (0.28 g, 2.0 mmol), DMAc (1.6 g), and toluene (5 mL). The mixture was heated to azeotrope off the resulting water with toluene. After the removal of toluene, the resulting mixture was heated at 167-170° C. When the reaction system became too viscous to be stirred, an additional 2 g of DMAc was added to dilute the solution, and the mixture was kept at 170° C. for an additional 20 min until the viscosity increased. The reaction mixture was cooled down, and diluted with dichloromethane. The solution was poured into 100 mL of methanol containing 1 mL of acetic acid to precipitate out the resulting polymer. The precipitated polymer was collected by filtration and redissolved in dichloromethane. The dichloromethane solution was filtered through a thin layer of Celite to remove the inorganic materials. The polymer was further purified by reprecipitation from dichloromethane solution into methanol. The polymer collected by filtration was dried in vacuo at 80° C. for 24 h. $\eta_{inh}$ 0.33 dL/g.

Examples 16-17

Copolymerization of benzimidazol-2-one with 4,4'-dihydroxybenzophenone and bis(4-fluorophenyl)sulfone

Example 16

This Example is a Typical Procedure Used for the Polymerization Reactions

To a 25 mL three-necked round-bottom flask equipped with a Dean-Stark trap, a condenser, a magnetic stirrer, and an argon inlet were added 4,4'-dihydroxybenzophenone (0.30 g, 1.4 mmol), benzimidazol-2-one (0.08 g, 0.60 mmol), bis(4-fluorophenyl)sulfone (0.51 g, 2.0 mmol), $CaCO_3$ (0.20 g, 2.0 mmol), anhydrous $K_2CO_3$ (0.28 g, 2.0 mmol), sulfolane (2 g), and chlorobenzene (3 mL). The mixture was heated to azeotrope off the resulting water with chlorobenzene. The chlorobenzene was then removed, and the resulting mixture was heated at 180-190° C. for 1-2 h. When the reaction system became too viscous to be stirred, an additional 2 g of sulfolane was added to dilute the solution. The mixture was heated at 180-190° C. for an additional 20 min until the viscosity significantly increased. The reaction mixture was cooled down, and diluted with dichloromethane. The solution was poured into 100 mL of methanol containing 1 mL of acetic acid to precipitate out the resulting polymer. The precipitated polymer was collected by filtration, and re-dissolved in dichloromethane. The dichloromethane solution was filtered through a thin layer of Celite to remove inorganic materials. The polymer was further purified by reprecipitation from dichloromethane solution into methanol. The polymer collected by filtration was dried in vacuo at 80° C. for 24 h (yield 94%).

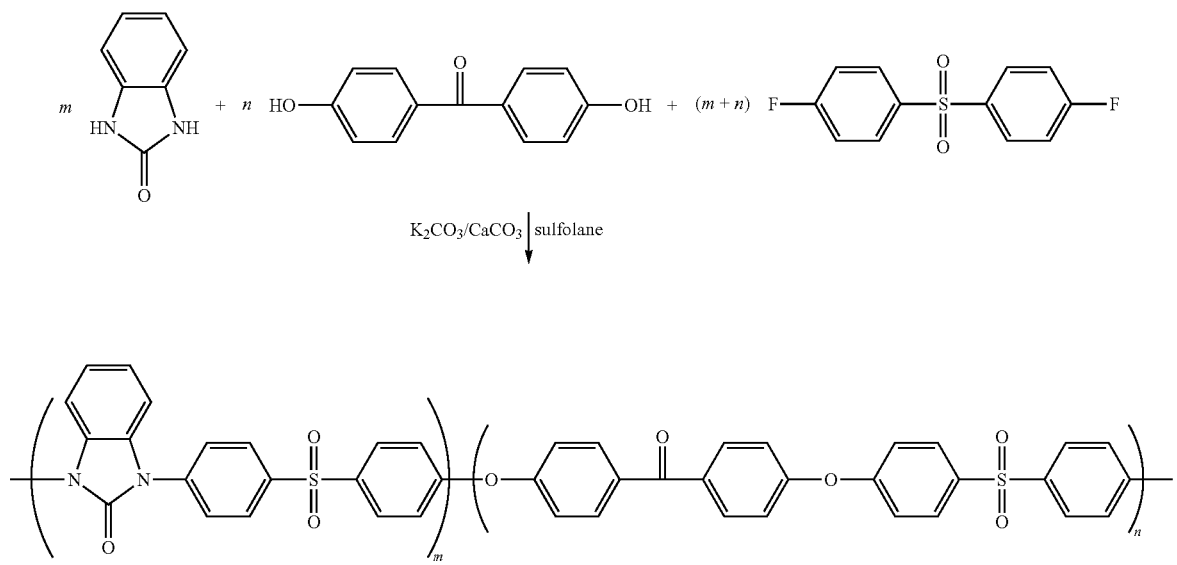

| Examples | HN─NH / O (benzimidazol-2-one) | F-C6H4-SO2-C6H4-F | HO-C6H4-CO-C6H4-OH | Tg (°C.) | TGA-5% (°C.) | η_inh (dL/g) |
|---|---|---|---|---|---|---|
| 16 | 30% | 100% | 70% | 190 | 510 | 0.42 |
| 17 | 50% | 100% | 50% | 216 | 532 | 0.52 |

Example 18

Copolymerization of benzimidazol-2-one with bis(4-mercaptophenyl)methanone and bis(4-fluorophenyl)sulfone

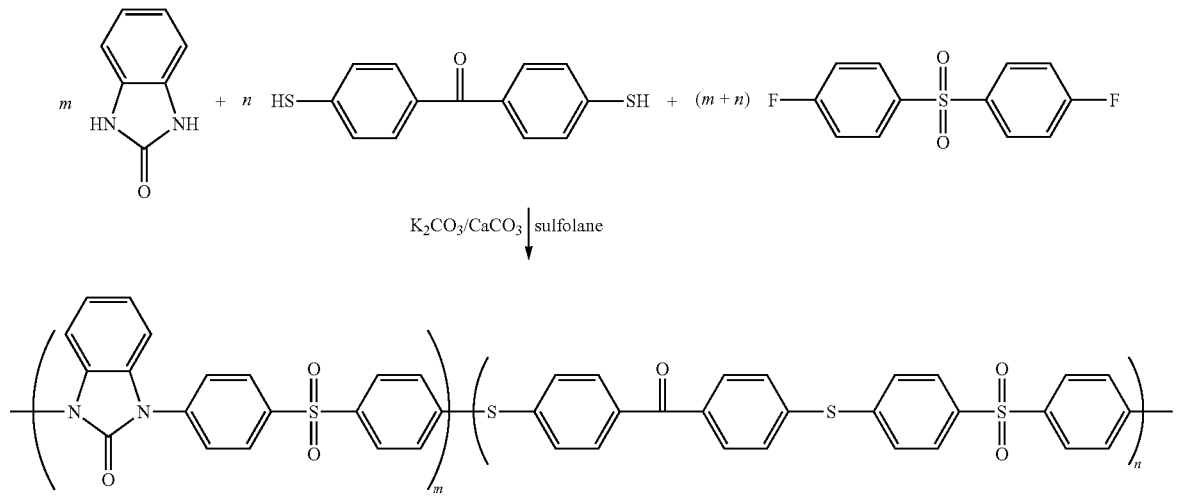

To a 25 mL three-necked round-bottom flask equipped with a Dean-Stark trap, a condenser, a magnetic stirrer, and an argon inlet were added bis(4-mercaptophenyl)methanone (0.049 g 0.20 mmol), benzimidazol-2-one (0.11 g, 0.80 mmol), bis(4-fluorophenyl)sulfone (0.25 g, 1.0 mmol), $CaCO_3$ (0.10 g, 1.0 mmol), anhydrous $K_2CO_3$ (0.14 g, 1.0 mmol), sulfolane (1.1 g), and chlorobenzene (3 mL). The mixture was heated to azeotrope off the resulting water with chlorobenzene. The chlorobenzene was then removed, and the resulting mixture was heated at 170-180° C. for 1-2 h. When the reaction system became too viscous to be stirred, an additional 2 g of sulfolane was added to dilute the solution. The mixture was heated at 170-180° C. for an additional 15 min, until the viscosity significantly increased. The reaction mixture was cooled down, and diluted with dichloromethane. The solution was poured into 50 mL of methanol containing 0.5 mL of acetic acid to precipitate out the resulting polymer. The precipitated polymer was collected by filtration, and redissolved in dichloromethane. The dichloromethane solution was filtered through a thin layer of Celite to remove inorganic materials. The polymer was further purified by reprecipitation from the dichloromethane solution into methanol. The polymer collected by filtration was dried in vacuo at 80° C. for 24 h (yield 96%).

| Example | benzimidazol-2-one | F-C6H4-SO2-C6H4-F | HS-C6H4-CO-C6H4-SH | T °C. | TGA-5% (°C.) | η_inh (dL/g) |
|---|---|---|---|---|---|---|
| 18 | 80% | 100% | 20% | 216 | 530 | 0.38 |

Example 19

Homo-polymerization of 2H-benzimidazol-2-one with bis(4-fluorophenyl)phenylphosphine oxide

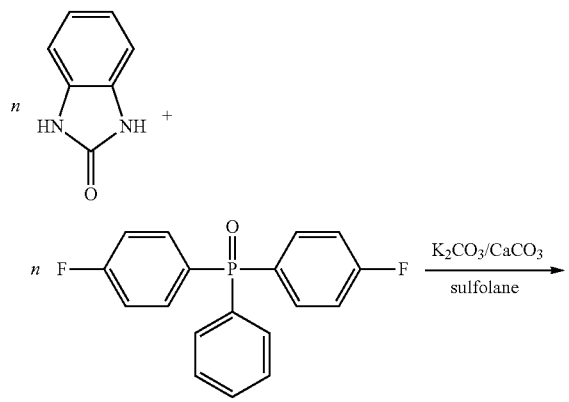

To a 25 mL three necked round-bottom flask equipped with a Dean-Stark trap, a condenser, a magnetic stirrer, and an argon inlet were added benzimidazol-2-one (0.27 g, 2.0 mmol), bis(4-fluorophenyl)phenylphosphine oxide (0.63 g, 2.0 mmol), CaCO$_3$ (0.20 g, 2.0 mmol), anhydrous K$_2$CO$_3$ (0.28 g, 2.0 mmol), sulfolane (1.7 g), and chlorobenzene (6 mL). The mixture was heated to azeotrope off the resulting water with chlorobenzene. After removal of all the chlorobenzene, the resulting mixture was heated at 200-210° C. for 6.5 h with the frequent addition of another 1 g of sulfolane, each time the reaction system became too viscous to be stirred. The reaction mixture was cooled down, and diluted with dichloromethane. The solution was poured into 100 mL of methanol containing 1 mL of acetic acid to precipitate out the resulting polymer. The precipitated polymer was collected by filtration, and redissolved in dichloromethane. The dichloromethane solution was filtered through a thin layer of Celite to remove inorganic materials. The polymer was further purified by reprecipitation from dichloromethane solution into methanol. The polymer collected by filtration was dried in vacuo at 80° C. for 24 h (yield 55%, dichloromethane-soluble part). Creaseable films were cast from its dichloromethane-solution. Tg 336° C., TGA −5% weight loss 466° C., $\eta_{inh}$ 1.1 dL/g.

Poly(Ether Ketone)s

Examples 20-22

Copolymerization of benzimidazol-2-one and BPA with 4,4'-difluorobenzophenone

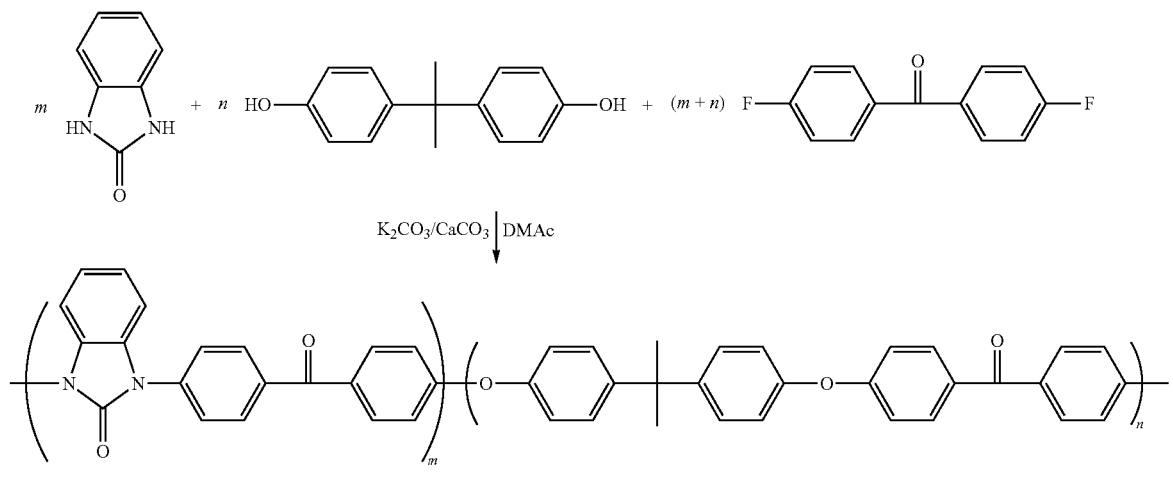

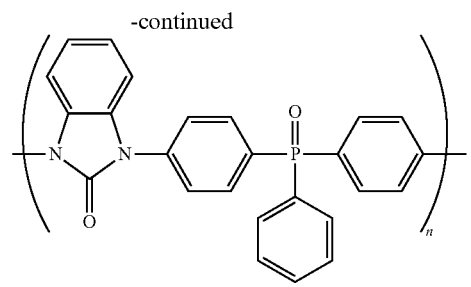

Example 20

This Example is a Typical Procedure Used for the Polymerization Reactions

To a 25 mL three-necked round-bottom flask equipped with a Dean-Stark trap, a condenser, a magnetic stirrer, and an argon inlet were added BPA (0.68 g, 3.0 mmol), benzimidazol-2-one (0.27 g, 2.0 mmol), 4,4'-difluorobenzophenone (1.1 g, 5.0 mmol), CaCO$_3$ (0.75 g, 7.5 mmol), anhydrous K$_2$CO$_3$ (0.76 g, 5.5 mmol), DMAc (3.8 g), and toluene (5 mL). The mixture was heated to azeotrope off the resulting water with toluene. The toluene was then removed, and the reaction mixture was heated at 160° C. for 1-2 h. When the reaction system became too viscous to be stirred, an additional 2 g of DMAc was added to dilute the solution, and the mixture was kept at 160° C. for an additional 30 min until the viscosity significantly increased. The reaction mixture was cooled down, and diluted with dichloromethane. The solution was poured into 150 mL of methanol containing 1.5 mL of acetic acid to precipitate out the resulting polymer. The precipitated polymer was collected by filtration, and redissolved in dichloromethane. The dichloromethane solution was filtered through a thin layer of Celite to remove inorganic materials. The polymer was further purified by reprecipitation from dichloromethane solution into methanol. The polymer collected by filtration was dried in vacuo at 80° C. for 24 h (yield 89%). Flexible, and creaseable films were cast from its dichloromethane-solution. Mn 15,000, Mw 37, 000, PD 1.9.

chlorobenzene (5 mL). The mixture was heated at 160-180° C. for 1 h to azeotrope off water. The resulting mixture was cooled to 100° C. To the cooled resulting mixture was added 4,4'-difluorobenzophenone (1.746 g, 8.02 mmol) in chlorobenzene. The mixture was heated and stirred at 200° C. for 1 h at 220° C. for 0.5 h, at 240° C. for 0.5 h, at 250-280 for 0.5 h and finally at 300-320° C. for 0.5-1 hours with the frequent addition of 1-1.5 g of diphenyl sulfone, each time the reaction

| Examples | ![benzimidazol-2-one] | ![difluorobenzophenone] | ![bisphenol A] | Tg (° C.) | TGA–5% (° C.) | η$_{inh}$ (dL/g) |
|---|---|---|---|---|---|---|
| 20 | 30% | 100% | 70% | 172 | 522 | 0.39 |
| 21 | 40% | 100% | 60% | 191 | 459 | 0.45 |
| 22 | 50% | 100% | 50% | 200 | 489 | 0.41 |

Examples 23-25

Copolymerization of benzimidazol-2-one with hydroquinone and 4,4'-difluorobenzophenone. Reaction carried out in one-step system became too viscous to be stirred. The resulting mixture was cooled to 200° C., and diluted with diphenyl sulfone. The resulting hot and viscous solution was slowly poured into methanol containing acetic acid to precipitate the polymer. The precipitated polymer was ground by a blender into a fine powder, and boiled in a mixture of methanol/water (3/1 v/v)

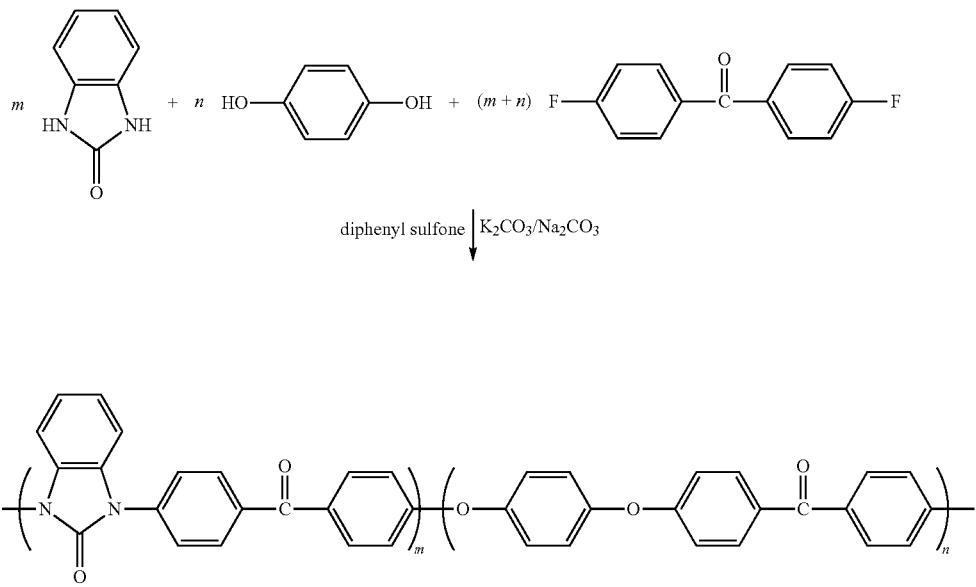

Example 23

This Example is a Typical Procedure Used for the Polymerization Reactions

To a three-necked round-bottom flask equipped with a Dean-Stark trap, a condenser, a magnetic stirrer, and an argon inlet were added hydroquinone (0.77 g, 7.0 mmol), 1H-benzo[d]imidazol-2(3H)-one (0.13 g, 1.0 mmol), potassium carbonate (ground and dried, 0.030 g, 0.22 mmol), sodium carbonate (0.87 g, 8.2 mmol), diphenyl sulfone (2 g), and for 1 h twice, and then in acetone for 1 h twice. The polymer was further washed with 5% HCl aqueous solution, water, and then acetone.

The resulting solid polymer was then dried in vacuo at 100° C. for 24 h. It had a glass transition temperature of 161° C. in the first run and 163° C. in the second run, Tc of about 234° C., and melting temperature of 306° C. The polymer was insoluble in chloroform, dimethylformamide (DMF). The polymer was melted in the DSC pan to give a tough film from the melt

| Example | 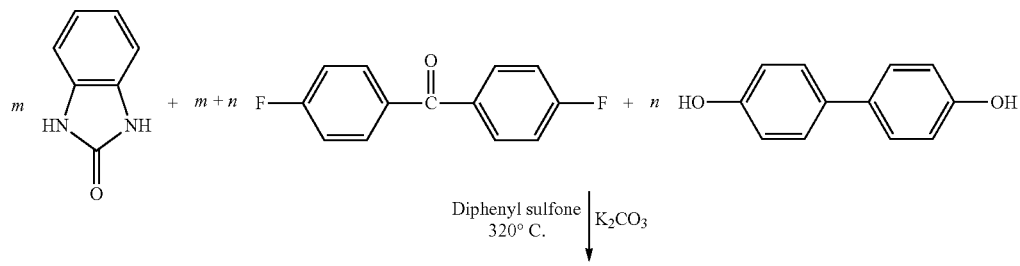 | | | Tg (°C.) | Tm (°C.) | Tc (°C.) | TGA-5% (°C.) |
|---|---|---|---|---|---|---|---|
| 23 | 12.5% | 100% | 87.5% | 163 | 306 | 234 | 502 |
| 24 | 20% | 100% | 80% | 180 | 290 | 207 | 476 |
| 25 | 30% | 100% | 70% | 186 | 270 | * | 437 |

Tg: * Weak Tc
Second runs

Example 26

Copolymerization of benzimidazol-2-one with 4,4'-biphenol and 4,4'-difluorobenzophenone

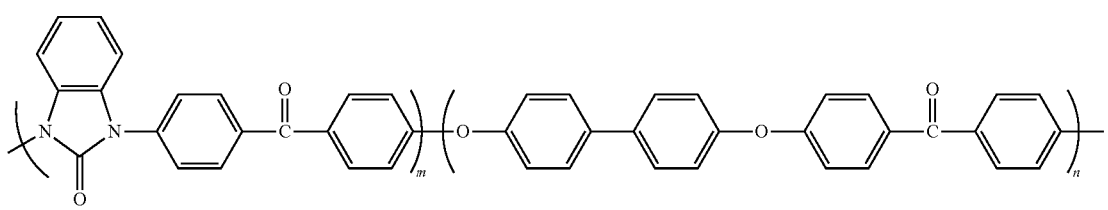

Example 26

This Example is a Typical Procedure Used for the Polymerization Reactions

To a 250 mL three-neck round-bottomed flask, equipped with a nitrogen inlet, magnetic stirrer, Dean-Stark trap and condenser, 10.90 grams (50.0 mmole) of dried 4,4'-difluorobenzophenone, 4.69 g (35 mmole) of benzimidazolone, 2.82 g (15 mmole) of dried 4,4'-biphenol and 7.35 g (53 mmole) of anhydrous potassium carbonate were charged. Diphenyl sulfone (66.25 g) and chlorobenzene 15 mL were then added. The reaction medium was heated to 170° C., and chlorobenzene was distilled to remove water formed during the condensation reaction over one hour. The reaction mixture was then further heated to 300° C. and maintained there for four hours. The reaction was continued for another hour at 320° C. and then terminated. The mixture was poured while hot into a glass vessel and cooled to room temperature. The cooled solid was then hammer-milled to fine particles and then put into a blender to make finer particles. The fine particles were then placed into a flask with 500 mL acetone, heated under reflux for one hour and then filtered. The process was repeated five times and finally refluxed with water for one hour, and then filtered. The process was repeated three times to remove inorganic salts. The resulting solid polymer was then dried at 120° C. in vacuo overnight. The polymer was insoluble in chloroform, dimethylformamide (DMF), and NMP. The polymer showed a glass transition temperature of 235° C. and TGA-5% weight loss of 581° C. and formed a creaseable film from the melt.

| Examples | HN-benzimidazol-2-one (NH, C=O) | F-C6H4-C(=O)-C6H4-F | HO-C6H4-C6H4-OH | Tg (°C.) | TGA-5% (°C.) |
|---|---|---|---|---|---|
| 26 | 70% | 100% | 30% | 235 | 581 |
| 27 | 50% | 100% | 50% | 239 | 506 |
| 28 | 30% | 100% | 70% | 217 | 475 |

DETAILED DESCRIPTION OF DRAWINGS

Figure 1:
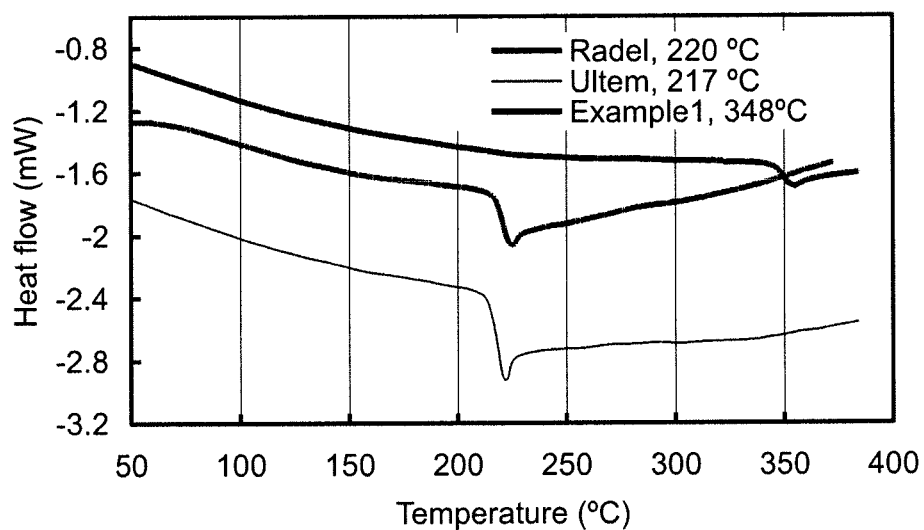
FIG. 1 is a graphical plot of DSC curves for the homopolymer of Example 1, Radel (trademark) and Udel (trademark)
Figure 2:
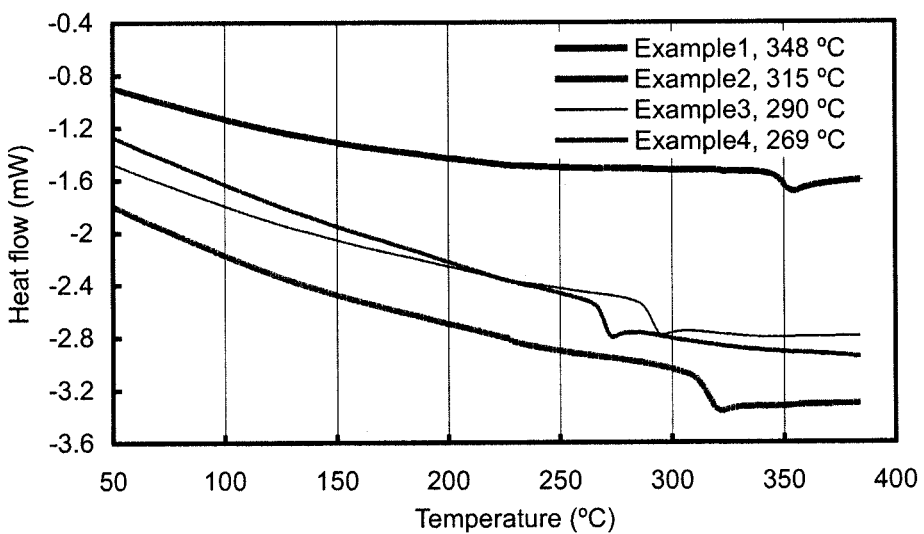
FIG. 2 is a graphical plot of DSC curves for the homopolymer of Example 1 and the copolymers of Examples 2 to 4.
Figure 3:
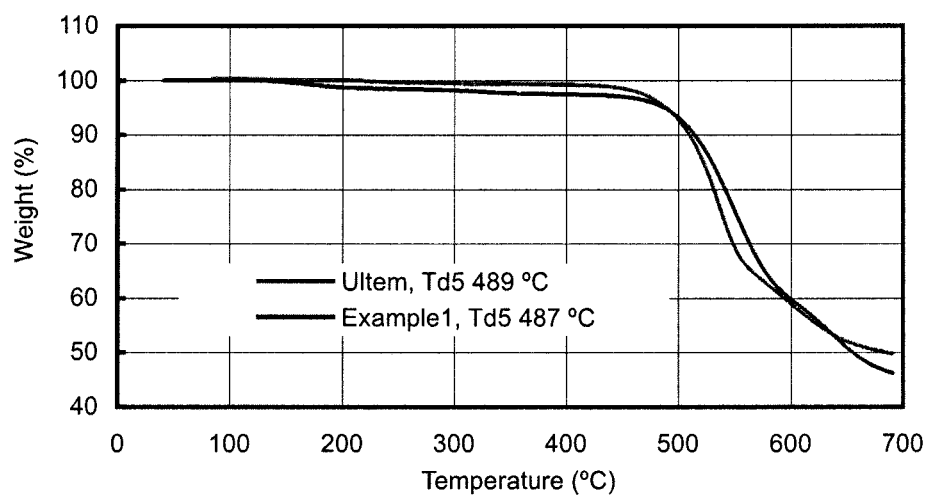
FIG. 3 is a graphical plot of TGA curves for the homopolymer of Example 1, and Udel (trademark).

DSC curves and TGA curves of homopolymers and copolymers of the invention, in accordance with Examples 1 to 4 are shown in the Figures along with data for Radel (trademark) and Ultem (trademark).

UV Absorption and Fluorescence

UV absorption and fluorescence properties of the monomer and polymers are shown in Table 4.

| Examples | $\lambda_{abs, nm}^a$ | $\lambda_{ex, nm}^b$ | $\lambda_{em, nm}^c$ |
|---|---|---|---|
| Benzimidazol-2-one | 283-289 | 263-290 | 309 |
| 2 | 285 | 316 | 392 |
| 3 | 286 | 321 | 393 |
| 5 | 298 | 321 | 399 |
| 6 | 271 | 317 | 392 |
| 7 | 270 | 318 | 394 |
| 20 | 290 | 360 | 475 |
| 22 | 280 | 388 | 474 |

[a]Maximum absorption wavenumber in UV-vis spectra
[b]Excitation wavenumber
[c]Emission wavenumber

REFERENCES

1. Berard, N., Paventi, M., Chan, K. P. and Hay, A. S., *Polymers from 4-(4-Hydroxyphenyl)phthalazin-1-one*. Makromol. Chem., Macromol. Symp., 1994. 77: p. 379-88.
2. Hay, A. S., *Polymers Derived from Phenolphthalein*, U.S. Pat. No. 5,237,062; 1993, Aug. 17;
3. Yoshida, S. and Hay, A. S., Synthesis of All Aromatic Phthalazinone Containing Polymers by a Novel N—C Coupling Reaction. Macromolecules, 1995. 28: p. 2579-81.
4. Wang, S. J., Meng, Y. Z., Hlil, A. R. and Hay, A. S., Synthesis and Characterization of Phthalazinone Containing Poly(arylene ether)s, Poly(arylene thioether)s, and Poly(arylene sulfone)s via a Novel N—C Coupling Reaction. Macromolecules, 2004. 37(1): p. 60-65.
5. Chang, J. W. W., Xu, X. H. and Chan, P. W. H., Practical copper-catalyzed N-arylation of nitrogen heterocycles with aryl halides under ligand and additive free conditions. Tetrahedron Letters, 2007. 48(2): p. 245-248.
6. Burgoyne, W. F. and William, F. B. J., Poly(arylene ether) polymer for adhesives, sealants and coatings, has polymer repeat units of specific formula, U.S. Pat. No. 6,716,955-B2;
7. Gao, Y., Hlil, A., Wang, J., Chen, K. and Hay, A. S., Synthesis of Homo- and Copoly(aryl bicarbazole)s via Nucleophilic Substituted Polycondensation Reactions of NH Groups with Activated Dihalides. Macromolecules, 2007. 40(14): p. 4744-4746.
8. Liu, Y., Qi, Y., Hlil, A. R., Meng, Y. and Hay, A. S., Polycarbazoles via C—N Coupling Reactions of Phthaloyl bis-9H-carbazoles with Activated Difluorides J. Pol. Sci. Chem., 2009. 47: p. 4326-4331.
9. Hay, A. S., Hlil, A. R. and Matsumura, S., *Poly(arylenebenzimidazole) polymers and copolymers.*, U.S. Pat. No. 7,696,298B2; 2010, Apr. 13, 2010;
10. Hlil, A. R., Matsumura, S. and Hay, A. S., Polymers Containing Di(1H-benzo[d]imidazol-2-yl)arene Moieties: Polymerization via N—C Coupling Reactions. Macromolecules 2008. 41: p. 277-280.
11. George, P. J., Condensation polymers of benzimidazolone U.S. Pat. No. 3,480,593-A; 1969,
12. Heyman, D. A., Synthesis of 1,3-Dihydro-2H-Benzimidazol-2-One from 2-Aminobenzamide. J. Hetero. Chem., 1978. 15(4): p. 573-576.
13. Vernin, G., Domlog, H., Siv, C., Metzger, J. and Elshafei, A. K., Synthesis of 1-Alkyl and 1,3-Dialkyl-2-Benzimidazolones from 1-Alkenyl-2-Benzimidazolones Using Phase Transfer Catalysis Technique. J. Hetero. Chem., 1981. 18(1): p. 85-89.
14. Cumper, C. W. N. and Pickerin. G d, *Electric Dipole-Moments of some Imadazolin-2(3)-Ones, and Analogous Thiones*. J. Chem. Soc.-Perkin Transactions 2, 1972(14): p. 2045-&.
15. Hayward, R. J. and Methcohn, O., N-Bridged Heterocycles.1. Synthesis and Chemistry of N,N'-Polymethylene-Ortho-Phenylene Diamines. J. Chem. Soc.-Perkin Transactions 1, 1975(3): p. 212-219.
16. Lee, C. C., Wang, P. S., Viswanath, M. B. and Leung, M. K., Synthesis of symmetrical and unsymmetrical N-aryl-substituted cyclic ureas through copper(I) iodide catalyzed Goldberg-Buchwald-Nandakumar C—N coupling reactions. Synthesis-Stuttgart, 2008(9): p. 1359-1366.

It should be appreciated that the invention is not limited to the particular embodiments described and illustrated herein but includes all modifications and variations falling within the scope of the invention as defined in the appended claims.

The invention claimed is:

1. A polymer or copolymer of the formula I

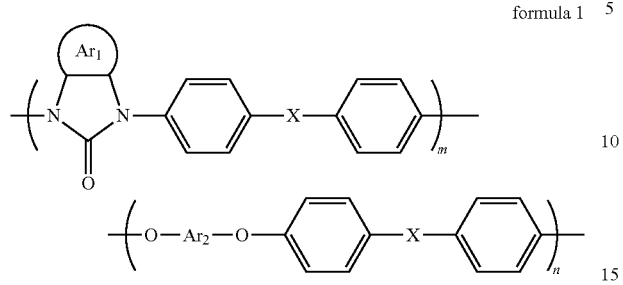

formula 1

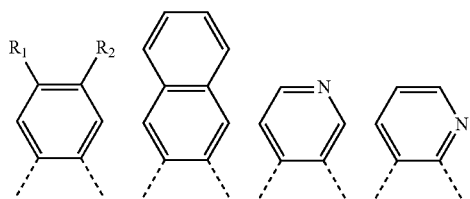

wherein $Ar_1$, $Ar_2$ and X are defined as follows:

$Ar_1$ is defined as a fused ring selected from the group consisting of:

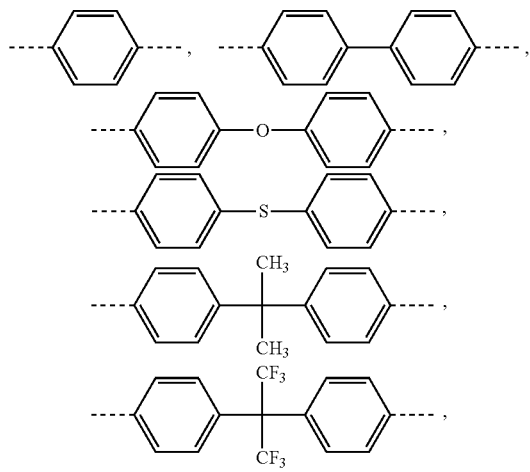

wherein $R_1$ and $R_2$ are radicals independently selected from the group consisting of H, alkyl, halo and aryl groups, $Ar_2$ is a divalent radical selected from the group consisting of:

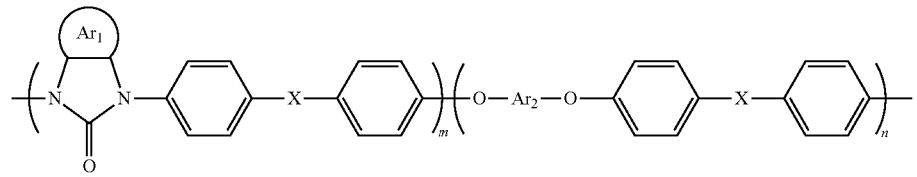

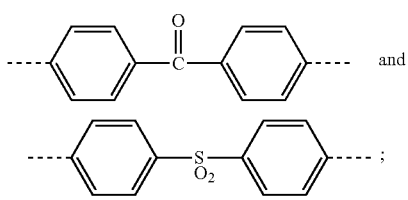

X is a divalent radical selected from the group consisting of:

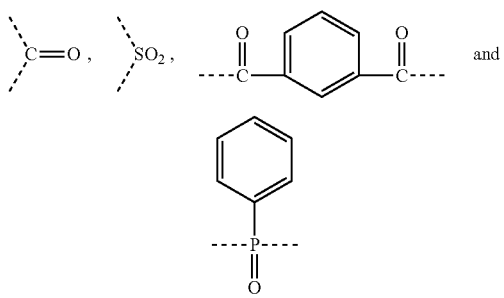

and (m+n) ranges from 1 to 10,000 where m is at least 1 and n is from 0 to 9999.

2. A polymer or copolymer as defined in claim 1, wherein X is

3. A polymer or copolymer as defined in claim 1, wherein X is

4. A polymer as defined in claim 1, wherein n is 0.

5. A polymer as defined in claim 4, wherein m is 30 to 500.

6. A copolymer as defined in claim 1, wherein m is 30 to 500 and n is 1 to 500.

7. A copolymer as defined in claim 6, wherein n is 30 to 500.

8. A process for the preparation of a polymer of formula I wherein
Ar₁, Ar₂ and X are defined as follows:
Ar₁ is defined as a fused ring selected from the group consisting of:

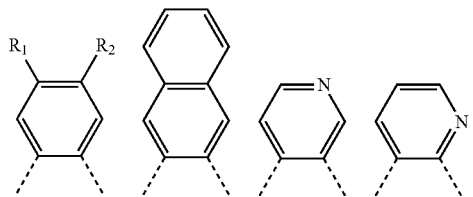

wherein $R_1$ and $R_2$ are radicals independently selected from the group consisting of
H, alkyl, halo, and aryl groups,
Ar₂ is a divalent radical selected from the group consisting of:

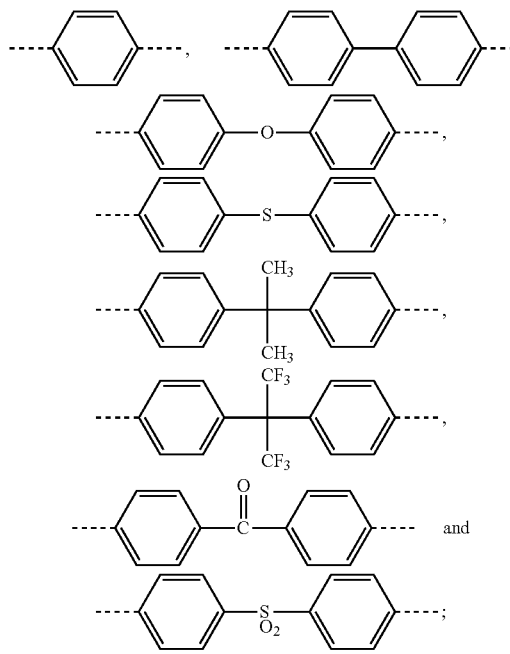

X is a divalent radical selected from the group consisting of:

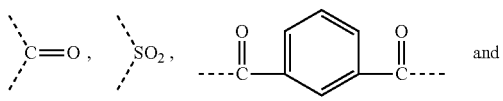

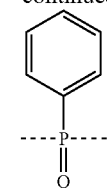

m is 1 to 10,000; and n is 0, comprising the reaction step:

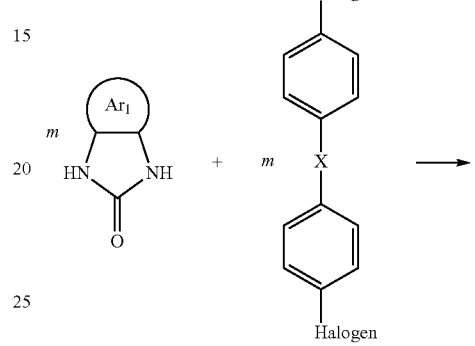

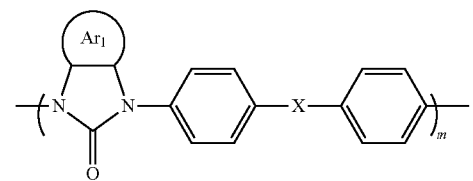

at a temperature of at least 160° C. wherein Ar₁, Ar₂, and m are as defined above, and Halogen is F or Cl.

9. A process according to claim 8, wherein X is

10. A process according to claim 8, wherein X is

11. A process according to claim 8, wherein m is 30 to 500.

12. A process for the preparation of a copolymer of formula I

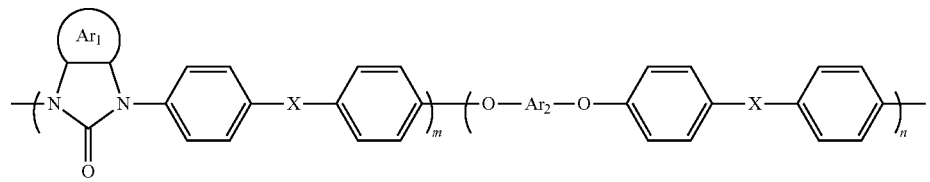

wherein $Ar_1$, $Ar_2$ and X are defined as follows:

$Ar_1$ is defined as a fused ring selected from the group consisting of:

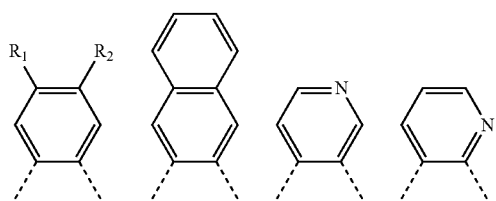

wherein $R_1$ and $R_2$ are radicals independently selected from the group consisting of
H, alkyl, halo, and aryl groups, $Ar_2$ is a divalent radical selected from the group consisting of:

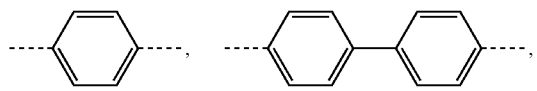

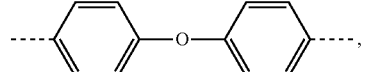

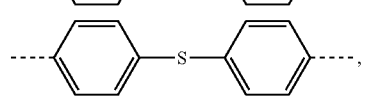

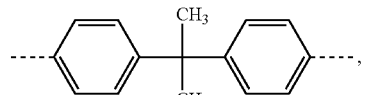

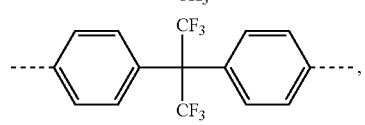

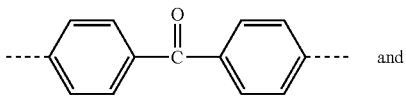 and

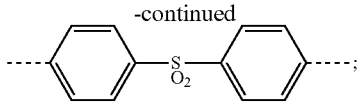

X is a divalent radical selected from the group consisting of:

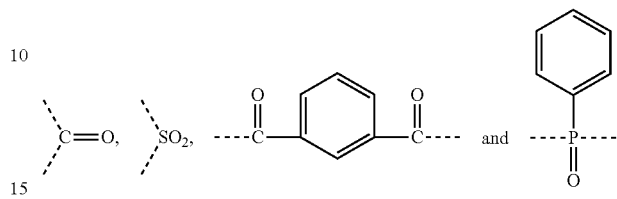

and (m+n) ranges from 1 to 10,000 where m is at least 1 and n is from 1 to 9999, comprising the reaction step:

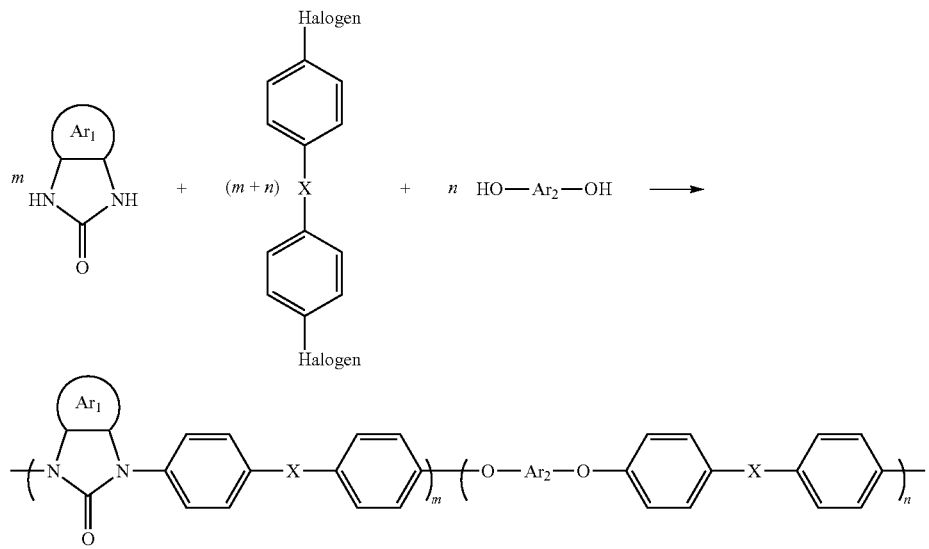

at a temperature of at least 160° C. wherein $Ar_1$, $Ar_2$, X, m and n are as defined above, and Halogen is F or Cl.

13. A process according to claim 12, wherein X is

14. A process according to claim 12, wherein X is

15. A process according to claim 12, wherein m is 30 to 500; and n is 30 to 500.

16. A cast film, molded article, extruded article or fiber of a polymer or copolymer of the formula I formula 1

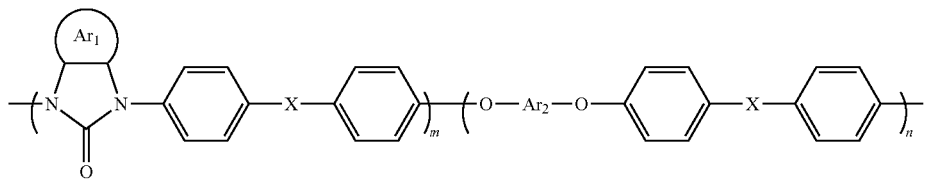

wherein $Ar_1$, $Ar_2$ and X are defined as follows:

$Ar_1$ is defined as a fused ring selected from the group consisting of:

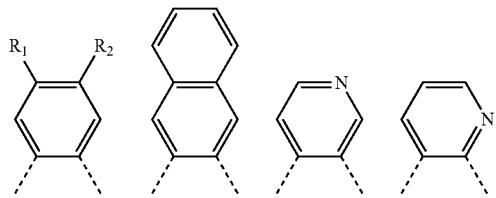

wherein $R_1$ and $R_2$ are radicals independently selected from the group consisting of
H, alkyl, halo, and aryl groups, $Ar_2$ is a divalent radical selected from the group consisting of:

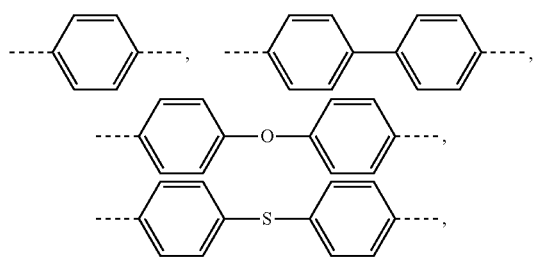

-continued

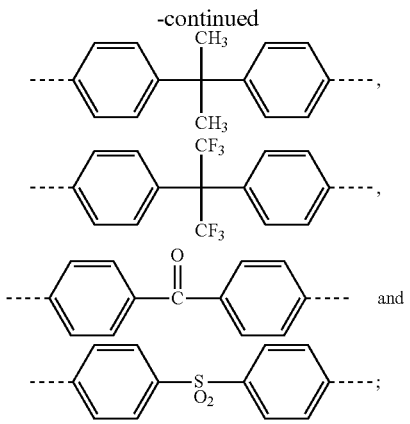

X is a divalent radical selected from the group consisting of:

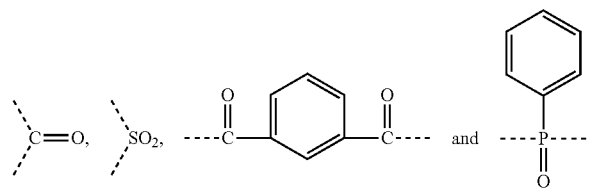

and (m+n) ranges from 1 to 10,000 where m is at least 1 and n is from 0 to 9999.

* * * * *